(12) United States Patent
Haragashira et al.

(10) Patent No.: US 12,523,720 B2
(45) Date of Patent: Jan. 13, 2026

(54) ANALYZING APPARATUS, MAGNETIC FIELD GENERATING APPARATUS FOR ANALYZING APPARATUS, AND ANALYZING METHOD

(71) Applicant: CANON MEDICAL SYSTEMS CORPORATION, Otawara (JP)

(72) Inventors: Motoji Haragashira, Utsunomiya (JP); Takashi Hatori, Yaita (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 266 days.

(21) Appl. No.: 18/329,093

(22) Filed: Jun. 5, 2023

(65) Prior Publication Data
US 2023/0393222 A1 Dec. 7, 2023

(30) Foreign Application Priority Data
Jun. 6, 2022 (JP) ................................. 2022-091829

(51) Int. Cl.
*G01N 27/74* (2006.01)
*G01R 33/12* (2006.01)

(52) U.S. Cl.
CPC ......... *G01R 33/1276* (2013.01); *G01N 27/74* (2013.01)

(58) Field of Classification Search
CPC ....... G01N 33/54366; G01N 33/54326; G01N 33/54333; G01R 33/1269; G01R 33/1276
See application file for complete search history.

(56) References Cited

U.S. PATENT DOCUMENTS

| | | |
|---|---|---|
| 8,237,434 B2 | 8/2012 | Van Lankvelt et al. |
| 8,618,508 B2 | 12/2013 | Wimberger-Friedl et al. |
| 9,157,891 B2 | 10/2015 | Ovsyanko et al. |
| 2010/0117772 A1 | 5/2010 | Van Lankvelt et al. |
| 2011/0168918 A1 | 7/2011 | Wimberger-Friedl et al. |
| 2011/0199080 A1* | 8/2011 | Ovsyanko .......... G01R 33/1269 324/253 |

(Continued)

FOREIGN PATENT DOCUMENTS

| | | |
|---|---|---|
| JP | 2012-503769 A | 2/2012 |
| JP | 5253423 B2 | 7/2013 |

(Continued)

OTHER PUBLICATIONS

Japanese Office Action dated Nov. 21, 2025, issued in Japanese Patent Application No. 2022-091829 (with English translation).

*Primary Examiner* — Lee E Rodak
*Assistant Examiner* — Taqi R Nasir
(74) *Attorney, Agent, or Firm* — Oblon, McClelland, Maier & Neustadt, L.L.P.

(57) ABSTRACT

An analyzing apparatus according to the present embodiment comprising: a sample placer where a cartridge is placed, the cartridge being capable of storing a sample containing a magnetic substance; an imager configured to be placed on an opposite surface side of a surface where the cartridge is placed on the sample placer and configured to image the sample by imaging from the opposite surface side; and a first magnetic field generator configured to be placed on the opposite surface side and to form a communicating port on a position corresponding to the imager and configured to generate a first magnetic field by forming a first magnetic pole around the communicating port.

18 Claims, 25 Drawing Sheets

(56) References Cited

U.S. PATENT DOCUMENTS

2017/0108495 A1* 4/2017 Ikeda ................ G01R 33/1269
2021/0231756 A1* 7/2021 Ikeda ................ G01R 33/1276

FOREIGN PATENT DOCUMENTS

| JP | 5759377 B2 | 8/2015 |
| JP | 5759378 B2 | 8/2015 |
| WO | WO 2008/107827 A1 | 9/2008 |
| WO | WO 2010/058303 A1 | 5/2010 |
| WO | WO 2018/062215 A1 | 4/2018 |
| WO | WO 2022/085770 A1 | 4/2022 |

* cited by examiner

ANALYZING APPARATUS, MAGNETIC FIELD GENERATING APPARATUS FOR ANALYZING APPARATUS, AND ANALYZING METHOD

CROSS REFERENCE TO RELATED APPLICATIONS

This application is based upon and claims the benefit of priority from the prior Japanese Patent Application No. 2022-091829, filed on Jun. 6, 2022, the entire contents of which are incorporated herein by reference.

FIELD

The embodiments disclosed in the present specification and drawings relate to an analyzing apparatus, a magnetic field generating apparatus for the analyzing apparatus, and an analyzing method.

BACKGROUND

Many hospitals are using analyzing apparatuses that detect an object to be detected such as a very low amount of virus or living substance to enable early diagnosis of an infectious disease. Such an analyzing apparatus couples the object to be detected in the sample with magnetic particles. Then, magnetic field generators of the analyzing apparatus placed above and below a sample placer in which a cartridge storing the sample containing the magnetic particles is placed sink and rise the magnetic particles quickly, and the magnetic field generators accumulate only the magnetic particles attached to the object to be detected on a sensor area. Then, the analyzing apparatus uses optical means and counts the number of magnetic particles caught in the sensor area in the cartridge storing the sample containing the magnetic particles in order to high sensitively detect and quantify the object to be detected contained in the sample.

In an optical means of the analyzing apparatus, an imager may be used to continuously observe a process of sinking and rising of the magnetic particles while counting a number of the magnetic particles caught in the sensor area. When the imager is used as the optical means, the imager should image the sensor area from below the cartridge. However, since the magnetic field generator placed below a sample placer becomes an obstacle, the imager is unable to image the process of sinking of the magnetic particles while sinking the magnetic particles by using the magnetic field generator. To solve this problem, the imager may image the sensor area of the cartridge through the communicating port of a magnet while sinking the magnetic particles by using a flat and annular magnet in the magnetic field generator.

However, when using the flat and annular magnet simply magnetized in a direction perpendicularly penetrating a closed curved surface bound by an outer circumference of the annular shape, it becomes disadvantageous for the imager to image the process of sinking of the magnetic particles since the magnetic particles do not accumulate in a center portion of the sensor area above the communicating port of the magnet, which is within an imaging area of the imager, but accumulate mostly in the sensor area of an inner circumference of the annular shape of the magnet. Thus, to continuously observe the process of sinking and rising of the magnetic particles in the analyzing apparatus, it is necessary to provide the magnetic field generator capable of accumulating the magnetic particles within the imaging range of the imager while placing the imager below the sample placer.

DETAILED DESCRIPTION

With reference to the drawings below, embodiments of an analyzing apparatus, a magnetic field generating apparatus for the analyzing apparatus, and an analyzing method will be described. In the description below, note that same reference signs are given for components substantially identical in terms of configuration and function, and duplicate description will be given only when necessary.

First Embodiment

Figure 1:
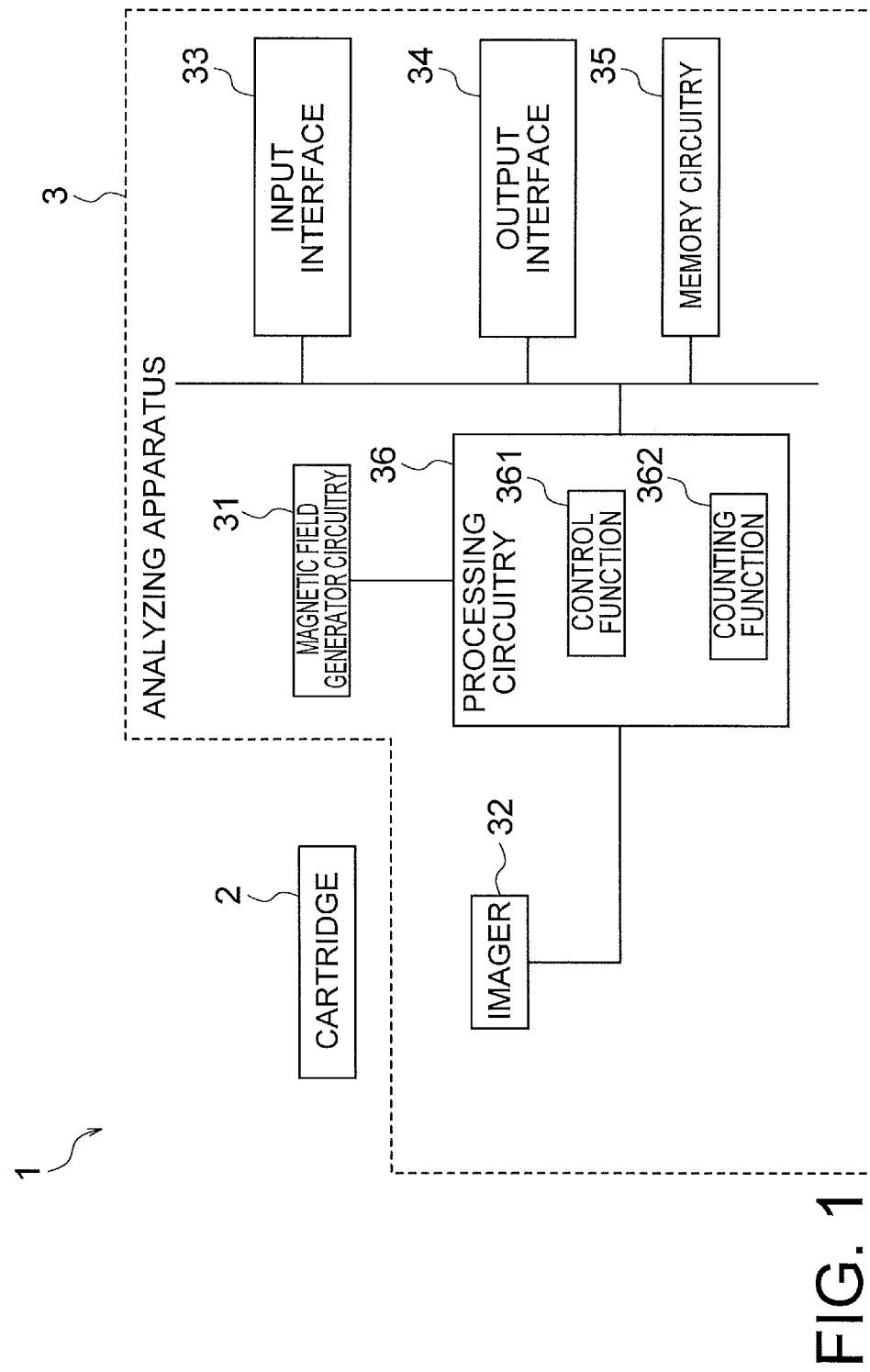
FIG. 1 is a block diagram illustrating an exemplary functional configuration of an analyzing system according to a first embodiment.
Figure 2:
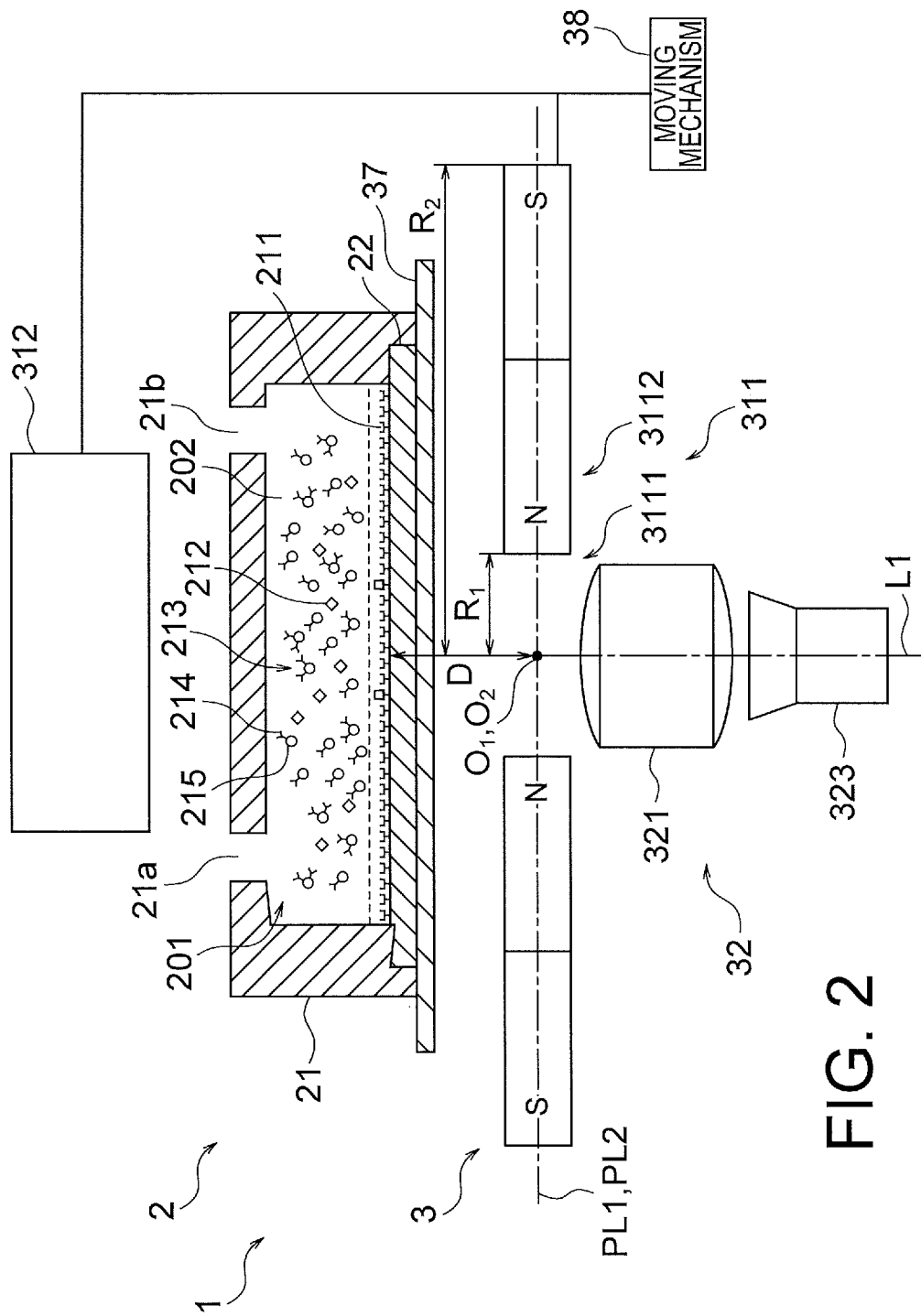
FIG. 2 is a diagram illustrating a detailed exemplary configuration of the analyzing system according to the first embodiment.

An exemplary configuration of the analyzing system according to a first embodiment will be described using FIGS. 1 and 2. FIG. 1 is a block diagram illustrating an exemplary functional configuration of an analyzing system according to the first embodiment. FIG. 2 is a diagram illustrating a detailed exemplary configuration of the analyzing system according to the first embodiment. As shown in FIG. 1, the analyzing system 1 has a cartridge 2 and an analyzing apparatus 3.

First, the cartridge 2 will be described using FIG. 2. The cartridge 2 is a vessel placed on the analyzing apparatus 3 when analyzing whether an object to be detected is included in a sample. The cartridge 2 is detachably placed on the analyzing apparatus 3. In the present embodiment, as shown in FIG. 2, the cartridge 2 has a housing 21 and a transparent substrate 22. The cartridge 2 is configured to be capable of storing the sample containing magnetic particles inside, i.e., in a reaction vessel 201 formed by the housing 21 and the transparent substrate 22. Note that the cartridge 22 may also be referred to such as an inspecting vessel, a reaction vessel, or a reaction unit. Also, the cartridge 2 may be used for various purposes, for example, to inspect viruses such as an influenza virus, an adenovirus, or a respiratory syncytial (RS) virus.

The housing 21 of the cartridge 2 is formed by, for example, resin. A first recess is formed on a bottom surface of the housing 21. A second recess is formed that constitutes a top and a side surface of the reaction vessel 201 is formed on a part of the top surface of the first recess. Also, the transparent substrate 22 is placed on the first recess. Also, an aperture 21a extends upward through the housing 21 is formed near one end of the top surface of the second recess so as to introduce the sample or the like into the reaction vessel 201 inside the housing, and an aperture 21b extends upward through the housing 21 is formed near the other end so as to release air from the reaction vessel 201. Note that a plurality of apertures 21a, 21b may be formed.

The transparent substrate 22 may be formed of materials that transmit light, for instance, such as resin or optical glass. A side surface of the transparent substrate 22 is placed in contact to the side surface of the first recess.

Regarding the reaction vessel 201, a top surface is configured by the top surface of the second recess of the housing 21, a side surface is configured by the side surface of the second recess of the housing 21, and the bottom surface is configured by the top surface of the transparent substrate 22. The top surface of the transparent substrate 22, i.e., the bottom surface of the reaction vessel 201 may also be called as a sensor surface.

The reaction vessel 201 stores the sample 202 and allows the object to be detected contained in the sample 202 to react with a reagent component 213. A plurality of first antibodies 211 is immobilized on the bottom surface among the surfaces that form the reaction vessel 201, i.e., the top surface of the transparent substrate 22. The first antibody 211 is a substance that specifically reacts with antigen 212 contained in the object to be detected by an antigen-antibody reaction. The first antibody 211 is immobilized on the top surface of the transparent substrate 22, for instance, by covalent bonding using the top surface of the transparent substrate 22 and an amino group of the antibody. Note that the reaction vessel 201 corresponds to a sample storage in the present embodiment.

The reaction vessel 201, for instance, is empty beforehand. During detection, for instance, the sample 202 is injected into the reaction vessel 201 from outside via the aperture 21a. The sample 202 contains the object to be detected containing the antigen 212 and the reagent component 213. The reagent component 213 contains, for instance, a second antibody 214 that specifically reacts with antigen 212 by the antigen-antibody reaction and the magnetic particles 215 coupled with the second antibodies 214. At least part of the magnetic particles 215 is formed by magnetic materials such as a magnetite. Regarding the magnetic particles 215, for instance, the surface of particles formed from the magnetic material is coated with a polymer material. Note that the magnetic particles 215 may be configured to coat the surface of particles made up of the polymer material with the magnetic material. Also, the magnetic particles 215 may be substituted by any sample 202 made to be dispersible. The magnetic particles correspond to a magnetic substance in the present embodiment.

By injecting the sample 202, the reaction vessel 201 stores the reagent component 213 and the antigen 212 contained in the object to be detected, in addition to the first antibody 211 immobilized on the top surface of the transparent substrate 22. When the sample 202 is injected to the reaction vessel 201, air inside the reaction vessel 201 is discharged outside from the aperture 21b.

The reagent component 213 can be dispersed in the sample 202 filled within the reaction vessel 201. The magnetic particles 215 in which a gravitation is greater than a buoyancy applied oppositely to the gravitation in the sample 202 are adopted in the embodiment. The magnetic particles 215 coupled with the second antibodies 214 are immobilized in a vicinity of the top surface of the transparent substrate 22 by the second antibody 214 coupled with the first antibody 211 via the antigen 212. Note that the second antibody 214 may be same or different from the first antibody 211.

Below, as shown in FIG. 2, the area from the surface of the transparent substrate 22 to a dotted line apart vertically upward in the reaction vessel 201, i.e., the area extending to the vicinity of the surface of the transparent substrate 22, is defined as a sensor area. When evanescent light is used to illuminate magnetic particles near the surface, a thickness of the sensor area refers to a distance at which the evanescent light seeps out from the surface.

Next, configuration details of the analyzing apparatus 3 will be described using FIGS. 1 and 2. As shown in FIG. 1, the analyzing apparatus 3 includes a magnetic field generator circuitry 31, an imager 32, an input interface 33, an output interface 34, a memory circuitry 35, and a processing circuitry 36. As shown in FIG. 2, the analyzing apparatus 3 also includes a placing table 37 where the cartridge is placed and a moving mechanism 38. Note that the placing table 37 corresponds to a sample placer in the present embodiment. The placing table 37 is provided with apertures or transparent windows, and has a structure that allows imaging the sample 202 in the cartridge 2 with the imager 32 through the aperture or through the transparent window of the placing table 37 and the transparent substrate.

The magnetic field generator circuitry 31 generates the magnetic field under the control of the processing circuitry 36 and applies the magnetic field to the cartridge 2. As shown in FIG. 2, the magnetic field generator circuitry 31, for instance, includes a lower magnetic field generator 311 and an upper magnetic field generator 312. Note that the analyzing apparatus 3 according to the present embodiment fulfills a role as a magnetic field generator apparatus for the analyzing apparatus when generating the magnetic field.

The lower magnetic field generator 311, for instance, is configured by a permanent magnet or an electromagnet. The moving mechanism 38 is unnecessary in the case of the electromagnet, and turning a drive current ON and OFF controls whether to apply a lower magnetic field in the case of the electromagnet. The lower magnetic field generator 311 is placed on an opposite surface side of a surface where the cartridge 2 is placed on the placing table 37, i.e., below the cartridge 2. The lower magnetic field generator 311 applies a downward magnetic field to the cartridge 2 by generating a vertically downward magnetic field. In other words, the lower magnetic field generator 311 moves the magnetic particles contained in the sample in a direction towards the imager 32. The lower magnetic field generator 311 corresponds to a first magnetic field generator in the present embodiment.

The upper magnetic field generator 312, for instance, is configured by the permanent magnet or the electromagnet. The moving mechanism 38 is unnecessary in the case of the electromagnet and turning a drive current ON and OFF controls whether to apply an upper magnetic field in the case of the electromagnet. The upper magnetic field generator 312 is placed on the side of the surface where the cartridge 2 is placed on the placing table 37, i.e., above the cartridge 2. The upper magnetic field generator 312 applies an upward magnetic field to the cartridge 2 by generating a vertically upward magnetic field. In other words, the upper magnetic field generator 312 moves the magnetic particles contained in the sample in a direction apart from the imager 32. The upper magnetic field generator 312 corresponds to a second magnetic field generator in the present embodiment.

Figure 3A:
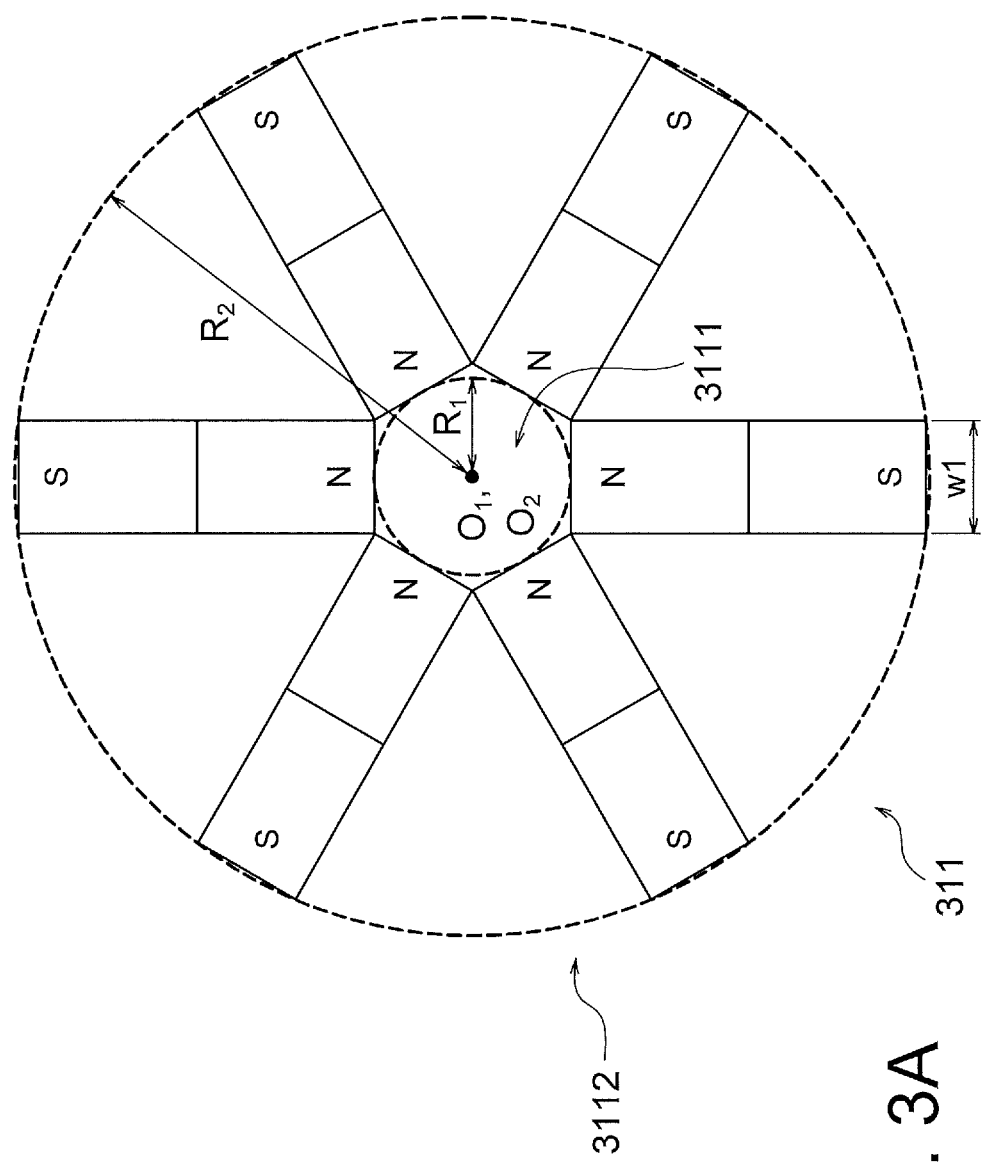
FIG. 3A is a diagram illustrating an exemplary top view of a lower magnetic field generator of an analyzing apparatus according to the first embodiment.

The configuration and placement of the lower magnetic field generator 311 will be described in detail using FIGS. 2 and 3A. FIG. 3A is a diagram illustrating an exemplary top view of the lower magnetic field generator 311 of the analyzing apparatus 3 according to the present embodiment. In the present embodiment, as shown in FIGS. 2 and 3A, a communicating port 3111 is formed on the lower magnetic field generator 311. The lower magnetic field generator 311 also includes a plurality of bar magnets 3112.

The communicating port 3111 is formed to communicate in an optical axis L1 direction of the imager 32. The communicating port 3111 is also formed at a position corresponding to the imager 32. The position corresponding to the imager 32, for instance, is a position in front (on the sample 202 side) the optical axis L1 direction of the imager 32. The communicating port 3111 is used by the imager 32 to continuously image the sample 202 through the communicating port 3111. Also, in the present embodiment, the communicating port 3111 is used by the lower magnetic field generator 311 to move to the position applying no magnetic field applying no downward magnetic field, which will be described later. Further, in the example shown in FIG. 3A, the communicating port 3111 is formed by each of the plurality of bar magnets 3112 with width W1 placed in contact with each other.

Figure 3B:
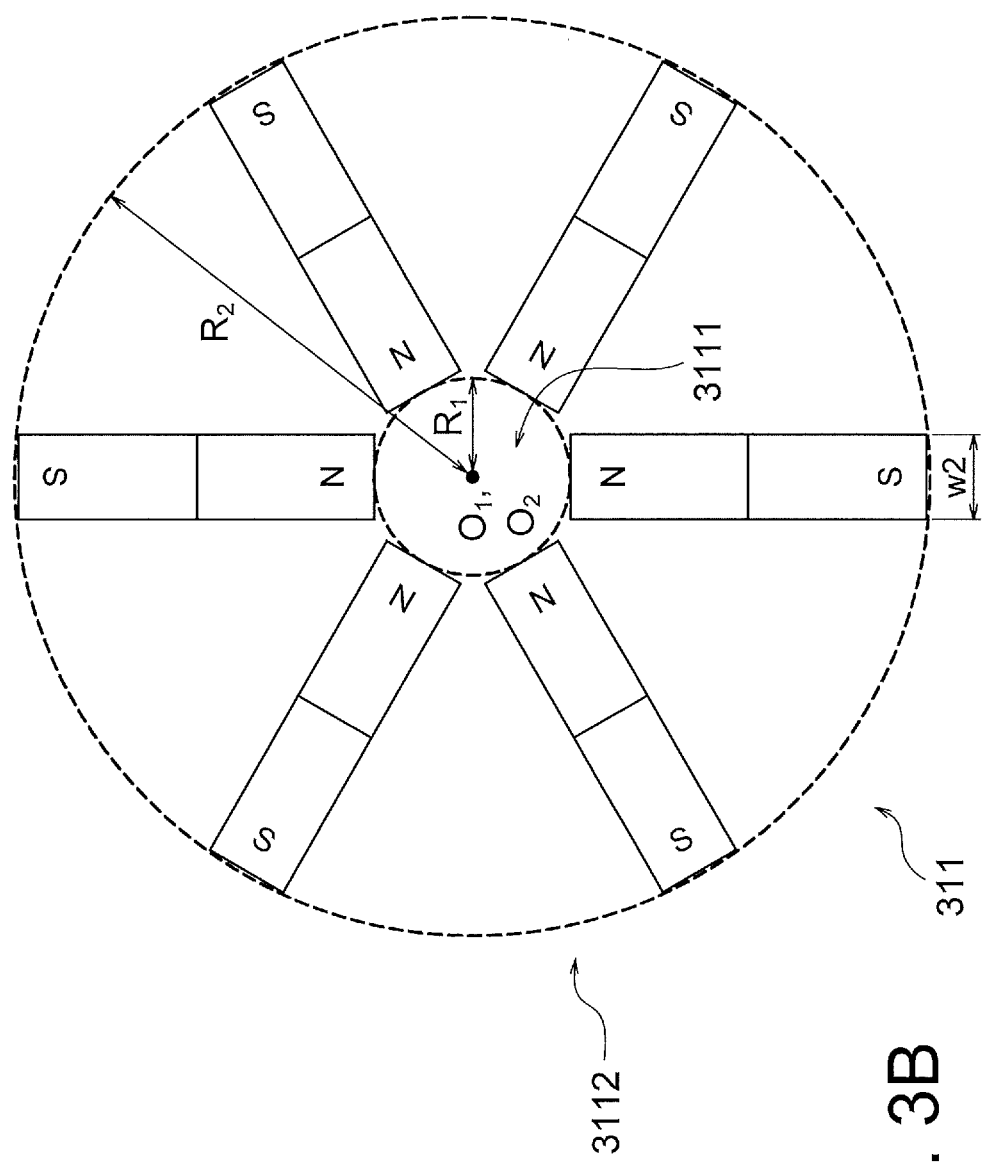
FIG. 3B is a diagram illustrating another exemplary top view of the lower magnetic field generator of the analyzing apparatus according to the first embodiment.

Note that the communicating port 3111 is not limited to be formed by each of the plurality of bar magnets 3112 placed in contact with each other. FIG. 3B is a diagram illustrating another exemplary top view of the lower magnetic field generator 311 of the analyzing apparatus 3 according to the present embodiment, which corresponds to FIG. 3A described above. In the example shown in FIG. 3B, each of the plurality of bar magnets 3112 with width W2 thinner than width W1 of each of the plurality of bar magnets 3112 shown in FIG. 3A is placed. As shown in FIG. 3B, each of the plurality of bar magnets 3112 with width W2 is apart from each other. The communicating port 3111 is still formed in such case. In other words, as shown in FIG. 3B, the communicating port 3111 according to the present embodiment may be formed by placing each of the plurality of bar magnets 3112 apart from each other.

Each of the plurality of bar magnets 3112 is configured by the permanent magnet. A first magnetic pole of each of the plurality of bar magnets 3112 is formed around the communicating port 3111 facing each other. Also, a second magnetic pole of each of the plurality of bar magnets 3112 is placed to arrange on a circumference apart from the communicating port 3111. In the present embodiment, the plurality of bar magnets 3112 includes six bar magnets.

The first magnetic pole of each of the plurality of bar magnets 3112 is located in a first plane PL1. Also, the first plane PL1 is parallel to the surface where the cartridge 2 is placed on the placing table 37. A first center $O_1$ showing the center of the first plane PL1 is located on the first plane PL1. The first center $O_1$ is the center of the communicating port 3111. Also, the second magnetic pole of each of the plurality of bar magnets 3112 is located in a second plane PL2. A second center $O_2$ showing the center of the second plane PL2 is located on the second plane PL2. The first plane PL1 and the second plane PL2 are parallel. Since the first center $O_1$ and the second center $O_2$ match in the present embodiment, the first plane PL1 and the second plane PL2 match.

In the present embodiment, as shown in FIGS. 2 and 3A, the North pole, which is the first magnetic pole of each of the six bar magnets 3112, is placed along a circumference of radius $R_1$ centered on the first center $O_1$. In other words, the North pole, which is the first magnetic pole of each of the six bar magnets 3112, is placed to arrange around the communicating port 3111. As such, the lower magnetic field generator 311 generates the downward magnetic field by forming the North pole, which is the first magnetic pole, around the communicating port 3111.

Also, in the present embodiment, as shown in FIGS. 2 and 3A, the South pole, which is the second magnetic pole of each of the six bar magnets 3112, is placed along a circumference centered on the first center $O_2$ of radius $R_2$ larger than $R_1$. In other words, the South pole, which is the second magnetic pole of each of the six bar magnets 3112, is placed to arrange on the circumference apart from the communicating port 3111.

Further, in the present embodiment, since the first magnetic poles of each of the six bar magnets 3112 are located on the first plane PL1, the second magnetic poles of each of the six bar magnets 3112 are located on the second plane PL2, and the first plane PL1 and the second plane PL2 match, the six bar magnets 3112 are placed such that a longitudinal direction of each of the six bar magnets 3112 is parallel to the surface where the cartridge 2 is placed on the placing table 37.

Note that the lower magnetic field generator 311 includes six bar magnets in the example shown in FIG. 3A, but the lower magnetic field generator 311 may have an arbitrary number of bar magnets. For instance, the lower magnetic field generator 311 may be configured to have two or more and five or less magnets or have seven or more magnets.

Also, in the example shown in FIG. 3A, although the cross-sectional shape of the bar magnets of the lower magnetic field generator 311 is rectangular, the cross-sectional shape of the bar magnets of the lower magnetic field generator 311 is not limited to be rectangular. In other words, the bar magnets may have an arbitrary cross-sectional shape such as round or oval.

Figure 4:
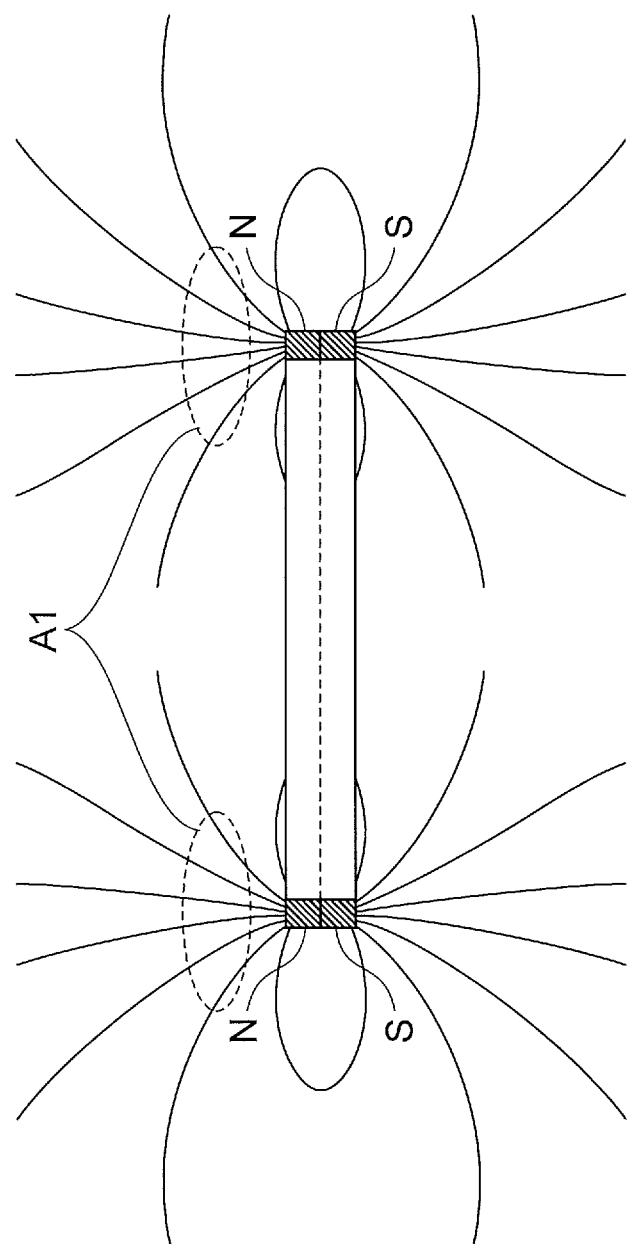
FIG. 4 is a diagram illustrating magnetic field lines in the configuration of the lower magnetic field generator according to a comparative example.
Figure 5:
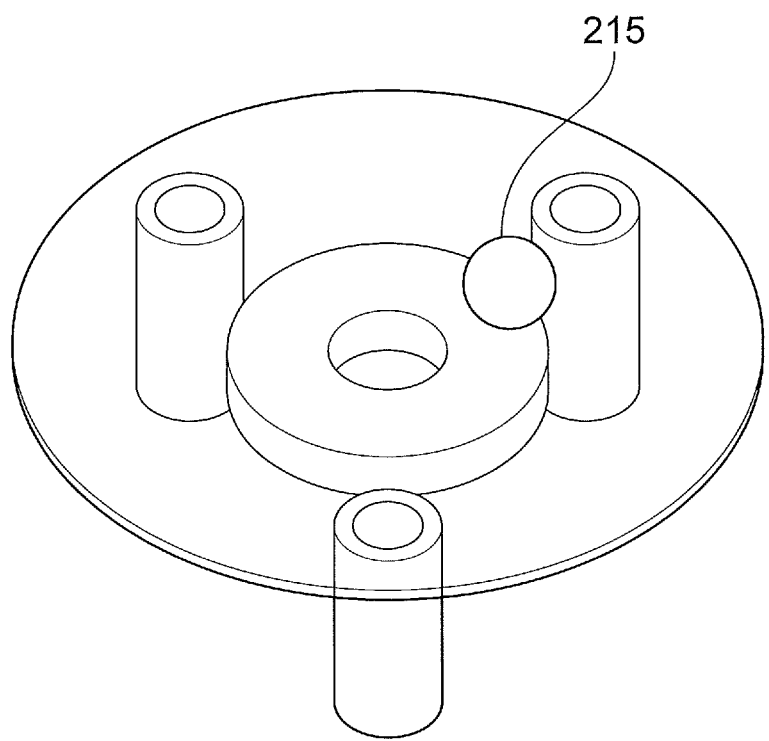
FIG. 5 is a diagram illustrating an attraction position of a magnetic particle in the configuration of the lower magnetic field generator according to the comparative example.
Figure 6:
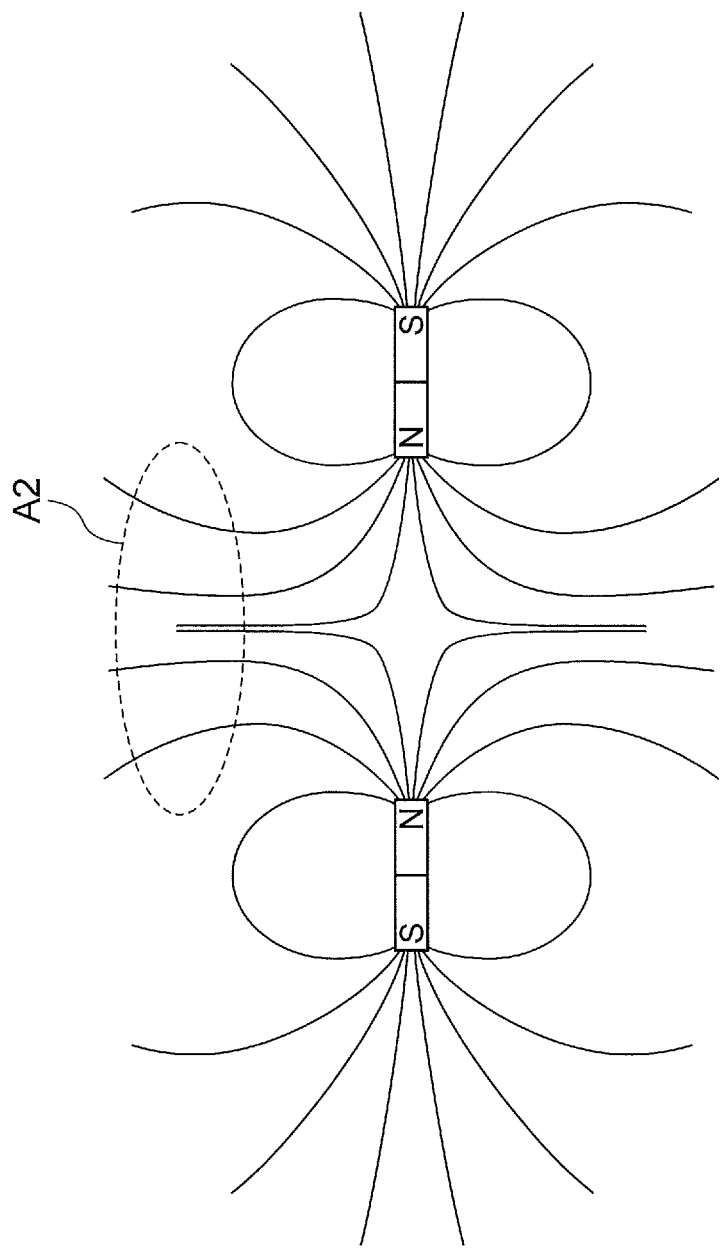
FIG. 6 is a diagram illustrating the magnetic field lines in the configuration of the lower magnetic field generator according to the first embodiment.
Figure 7:
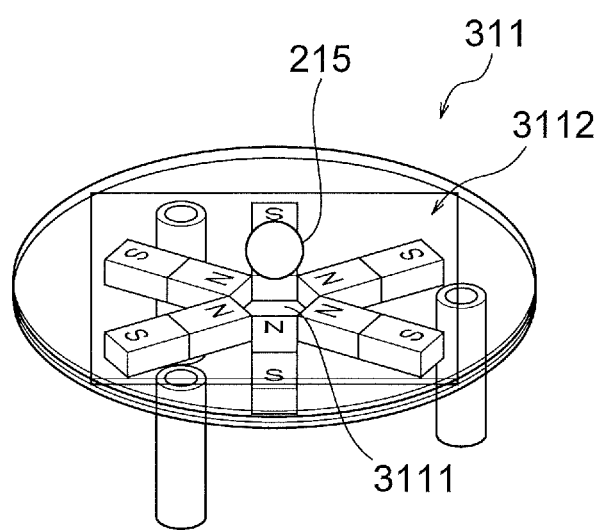
FIG. 7 is a perspective view illustrating the attraction position of the magnetic particle in the configuration of the lower magnetic field generator according to the first embodiment.
Figure 8:
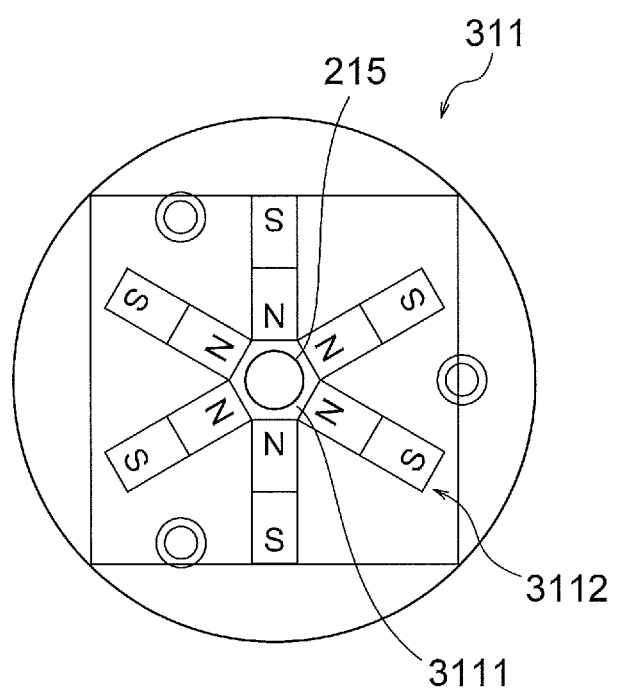
FIG. 8 is a top view illustrating the attraction position of magnetic particles in the configuration of the lower magnetic field generator according to the first embodiment.
Figure 9:
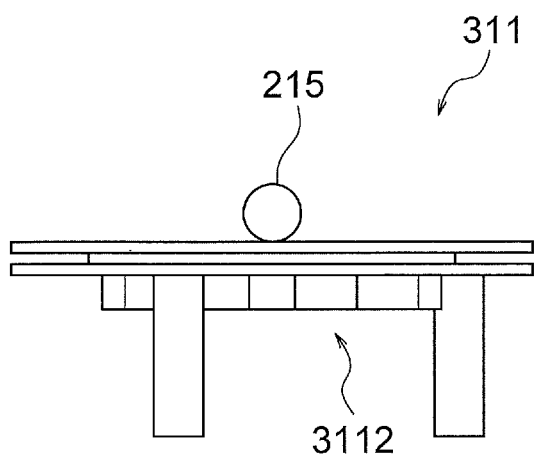
FIG. 9 is a side view illustrating the attraction position of magnetic particles in the configuration of the lower magnetic field generator according to the first embodiment.
Figure 10:
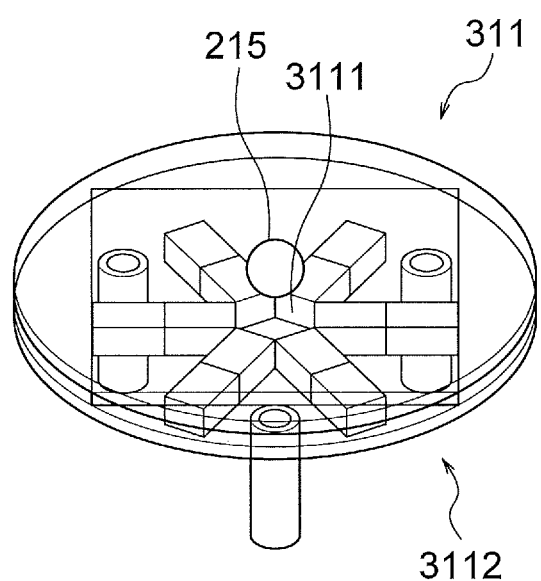
FIG. 10 is a perspective view illustrating the attraction position of magnetic particles in the configuration of the lower magnetic field generator according to the first embodiment.

Here, referring to FIGS. 4 to 10, the magnetic field lines and an attraction position of the magnetic particle 215 in the configuration of the lower magnetic field generator 311 according to the present embodiment and the magnetic field lines and the attraction position of the magnetic particle 215 in the configuration of the lower magnetic field generator 311 according to a comparative example will be described. FIG. 4 is a diagram illustrating the magnetic field lines in the configuration of the lower magnetic field generator according to the comparative example. FIG. 5 is a diagram illustrating the attraction position of the magnetic particle in the configuration of the lower magnetic field generator according to the comparative example. An actual diameter of the magnetic particle 215 is around 1 μm but the magnetic particle 215 is deliberately exaggerated and drawn large in FIG. 5 for ease of understanding of the attraction position of the magnetic particles 215. FIG. 6 is a diagram illustrating the magnetic field lines in the configuration of the lower magnetic field generator 311 according to the present embodiment. FIGS. 7 to 10 are diagrams illustrating the attraction position of the magnetic particle 215 in the configuration of the lower magnetic field generator 311 according to the present embodiment. In FIGS. 7 to 10, the magnetic particle 215 is deliberately exaggerated and drawn large for ease of understanding of the attraction position of the magnetic particles 215.

As shown in FIGS. 4 and 5, the lower magnetic field generator according to the comparative example is a flat and annular magnet simply magnetized in a direction perpendicularly penetrating a closed curved surface bound by an outer circumference of the annular shape. The North pole, which is the first magnetic pole, is formed above the magnet, and the South pole, which is the second magnetic pole, is formed below the North pole, which is the first magnetic pole. As such, since the South pole is formed without separation from the North pole, in the lower magnetic field generator according to the comparative example, as shown in FIG. 4, the lower magnetic field generator according to the comparative example generates a magnetic field area A1 where the magnetic field lines are focused above the North pole.

By generating such magnetic field area A1, the lower magnetic field generator 311 according to the comparative example attracts the magnetic particle 215 above the North pole as shown in FIG. 5. Thus, magnetic particles cannot be accumulated within an imaging range of the imager 32, and the imager 32 may be disadvantaged for imaging the magnetic particle 215 through the communicating port 3111, making the measurement results of the analyzing apparatus 3 less accurate.

On the other hand, in the lower magnetic field generator 311 according to the present embodiment, as shown in FIG. 6, the North poles, which are the first magnetic poles of the plurality of bar magnets 3112, are placed around the communicating port 3111 facing each other. Also, the South poles, which are the second magnetic poles of the plurality of bar magnets 3112, are placed so that the magnetic field in a substantially vertical direction is formed at a sample position, which is a position where the cartridge 2 that stores the sample 202 is placed on the placing table 37. In other words, the South poles, which are the second magnetic poles of the plurality of bar magnets 3112, are formed at a spaced position which is apart from the communicating port 3111 and which do not affect the magnetic field (e.g., magnetic field area A2) according to the first magnetic poles formed around the communicating port 3111. By placing the first and second magnetic poles apart, as shown in FIG. 6, the lower magnetic field generator 311 may generate the magnetic field area A2 where the magnetic field lines once converge, and where the converged magnetic field lines diverge in the upward direction between the North pole, which is each of the first magnetic poles of the plurality of bar magnets 3112. In other words, by placing the cartridge 2, which stores the sample 202 containing the magnetic particles 215, on the magnetic field area A2, the magnetic field may be formed in the substantially vertical direction at the sample position, which is the position where the cartridge 2 that stores the sample 202 is placed on the placing table 37.

By generating such magnetic field area A2, the lower magnetic field generator 311 according to the present embodiment may attract the magnetic particle 215 above the communicating port 3111 as shown in FIGS. 7 to 10. Accordingly, since the magnetic particles may be accumulated within the imaging range of the imager 32 and the imager 32 may image the magnetic particles 215 through the communicating port 3111, the measurement results of the analyzing apparatus 3 becomes more accurate compared to the lower magnetic field generator 311 according to the comparative example.

Here, the magnetic field generated by the second magnetic pole does not affect the magnetic field of the first magnetic pole formed around the communicating port 3111. The spaced position which is apart from the opening port 3111, for instance, is a position where a distance from the first to the second magnetic pole is sufficiently large compared to the distance from the first center $O_1$, which is the center of the communicating port 3111, to the first magnetic pole. The distance from the first to the second magnetic pole, for instance, is the distance from an end face of the first magnetic pole to an end face of the second magnetic pole, which is the difference between radius $R_1$ and radius $R_2$ in the present embodiment.

Also, the distance from the first to the second magnetic pole being sufficiently large compared to the distance from the first center $O_1$, which the center of the communicating port 3111, to the first magnetic pole, for instance, is a position where the distance from the first to the second magnetic pole is three times or more the distance from the first center $O_1$, which the center of the communicating port 3111, to the first magnetic pole. In other words, in the present embodiment, the distance from the first to the second magnetic pole is three times or more the radius $R_1$. If the distance from the first to the second magnetic pole is less than three times the distance from the first center $O_1$, which is the center of the communicating port 3111, to the first magnetic pole, it becomes disadvantageous to attract the magnetic particles 215 stored in the cartridge 2 to the magnetic field area A2 since the magnetic field is canceled in the substantially vertical direction and the magnetic field intensity becomes weak as shown in FIG. 6 at the sample position, where the cartridge 2 that stores the sample is placed on the placing table 37.

Note that the distance from the first to the second magnetic pole was defined as the distance from the end face of the first magnetic pole to the end face of the second magnetic pole for sake of convenience, but the distance from the first to second magnetic pole is not limited to this. In other words, the distance may be defined from a center of the first magnetic pole (position slightly secluded from the end face of the magnet) to the center of the second magnetic pole.

Figure 11:
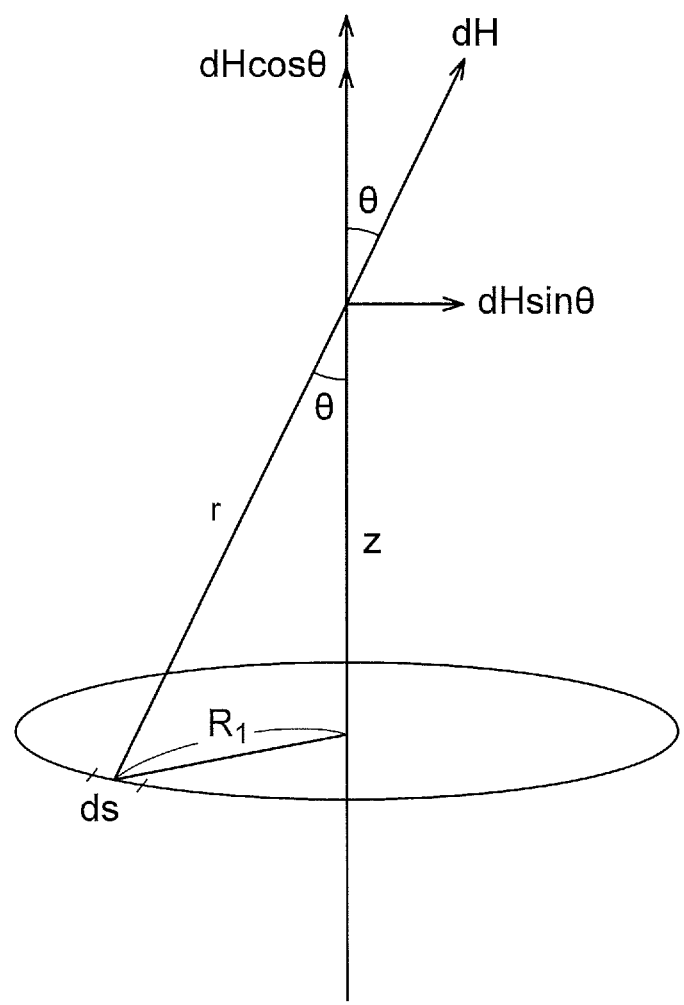
FIG. 11 is a diagram describing a magnetic field created at a z position by a single magnetic load distributed around a circumference, when the single magnetic load of reverse polarity is sufficiently far away that its action may be considered negligible.

Next, the position where an attractive force of the vertical magnetic field formed by the first magnetic pole placed around the communicating port 3111 becomes maximum will be described referring to FIG. 11. FIG. 11 is a diagram describing the magnetic field H created at a z position by a single magnetic load distributed around a circumference, when the single magnetic load of reverse polarity is sufficiently far away that its action may be considered negligible. In FIG. 11, the magnetic field H created at the z position is considered when the magnetic loads of the same polarity are uniformly distributed around the circumference with a total amount $Q_m$. Note that a width of the circle is ignored. As in FIG. 11, the magnetic field created by a microsection ds on a point on a z-axis is expressed as equation (1).

$$dH = \frac{dQ_m}{4\mu_0 \pi r^2} \quad (1)$$

Note that $\mu_0$ is a permeability of vacuum.

In addition, since the horizontal magnetic field cancels out the magnetic field created by the magnetic load 180 degrees opposite on the circumference, the horizontal magnetic field disappears when calculating the magnetic field created by all magnetic loads on the circumference. In other words, the calculation of the magnetic field created by the magnetic load on the circumference only requires calculating the magnetic field H created on the z-axis. Therefore, the magnetic field on the z-axis is expressed as equation (2).

$$dH \cos\theta = \frac{\cos\theta \, dQ_m}{4\mu_0 \pi r^2} \quad (2)$$

By adding up the magnetic fields (dH cos θ) on the circumference, the expression becomes H cos θ=cos θΣdH, i.e., expressed as equation (3).

$$H \cos\theta = \cos\theta \sum dH \quad (3)$$
$$= \frac{\cos\theta \sum dQ_m}{4\pi\mu_0 r^2}$$

Here, cos θ is expressed as equation (4).

$$\cos\theta = \frac{z}{r} = \frac{z}{\left(R_1^2 + z^2\right)^{\frac{1}{2}}} \quad (4)$$

$\Sigma dQ_m$ is the sum of all magnetic loads on the circumference, $\Sigma dQ_m$ is expressed as $Q_m$, and using $Q_m$, the magnetic field created on the z-axis by the magnetic load uniformly distributed on the circumference is expressed as equation (5).

$$\frac{Q_m z}{4\pi\mu_0\left(R_1^2 + z^2\right)^{\frac{3}{2}}} \quad (5)$$

Then, based on equation (5), the position where the vertical attraction force of the magnetic field H formed by the first magnetic pole placed around the connection port 3111 becomes maximum is calculated as in equations (6) to (10).

$$\frac{d}{dz}\left\{\frac{z^2}{\left(R_1^2 + z^2\right)^3}\right\} = \frac{2z(R_1^2 - 2z^2)}{\left(R_1^2 + z^2\right)^4} \quad (6)$$

$$\frac{d}{dz}\left\{\frac{z^2}{\left(R_1^2 + z^2\right)^3}\right\} = \frac{2(R_1^4 - 13R_1^2 z^2 + 10z^4)}{\left(R_1^2 + z^2\right)^5} \quad (7)$$

$$\frac{d}{dz}\left\{\frac{z^2}{\left(R_1^2 + z^2\right)^3}\right\} = 0 \quad (8)$$

$$z^2 = \frac{13R_1^2 \pm \sqrt{169R_1^4 - 40R_1^4}}{20} \quad (9)$$

$$= \left(\frac{13 \pm \sqrt{129}}{20}\right) R_1^2$$

$$\therefore z = \pm 0.082 R_1, \pm 1.10 R_1 \, (R_1 > 0) \quad (10)$$

At this time, since the second magnetic pole of different polarity from the first magnetic pole is apart from the first magnetic pole, it may be assumed that the effect of the second magnetic pole on the attraction force of the first magnetic pole can be ignored.

In the calculation results expressed in equation (10), placing the cartridge 2 at the position where distance D from the first center $O_1$, which is the center of the communicating port 3111 formed at the position corresponding to the imager 32, to the sensor surface of the cartridge 2, becomes $\pm 0.082 R_1$ means placing at the position secluded from the surface of the communicating port 3111, which is difficult due to the configuration of the apparatus since the magnet itself has thickness. Also, placing the cartridge 2 at the position where the distance D from the first center $O_1$, which is the center of the communicating port 3111 formed at the position corresponding to the imager 32, to the sensor surface of the cartridge 2, becomes $-1.10R_1$, is difficult since the cartridge 2 is placed at a position interfering with the imager 32. Accordingly, based on the calculation expressed in equation (10), the cartridge 2 is preferably placed at the position where the distance D from the first center $O_1$, which is the center of the communicating port 3111 formed at the position corresponding to the imager 32, to the sensor surface of the cartridge 2, becomes $1.10R_1$.

Here, it will be described why four solutions are derived at a position shown in equation (10), where the vertical attraction force of the magnetic field H formed by the first magnetic poles placed around the communicating port 3111 becomes maximum. First, an equation of the attraction force $F_m$ acting only on the magnetic particle is expressed as in equation (11).

$$\vec{F_m} = \frac{1}{2}\mu_0(\kappa_p - \kappa_f)V_p\nabla H^2 \quad (11)$$

Here, $\kappa_p$ is a volume magnetic susceptibility of the particles, $\kappa_f$ is the volume magnetic susceptibility of a fluid, $\mu_0$ is the magnetic permeability of vacuum, and $V_p$ is a volume of the magnetic particles.

Next, an equation transforming equation (11) into a relational expression of magnetic flux density B is expressed by equation (12).

$$\vec{F_m} = \frac{1}{\mu_0}(\chi_p - \chi_f)m_p B\nabla B \quad (12)$$

Here, $\chi_p$ is a mass magnetic susceptibility of the particles, and $\chi_f$ is the mass magnetic susceptibility of the fluid, and $m_p$ is the mass of the particles.

As shown in equation (11), the attraction force $F_m$ acting only on the magnetic particles is not only proportional to a square of the magnetic field intensity H but also is proportional to a gradient of the square of the magnetic field (magnetic field intensity) H. Also, as shown in equation (12), the attraction force $F_m$ acting only on the magnetic particles is not only proportional to the square of the magnetic flux density but also is proportional to a product of the magnetic flux density and the gradient of the magnetic flux density. Thus, as shown in equations (11) and (12), four solutions are derived at the position shown in equation (10), where the vertical attraction force of the magnetic field H formed by the first magnetic poles placed around the communicating port 3111 becomes maximum.

Going back to FIGS. 1 and 2, the imager 32 is an optical device for identifying and counting the magnetic particles 215 one by one, coupled to the sensor area of the cartridge 2 placed on the placing table 37 of the analyzing apparatus 3, under the control of the processing circuitry 36. The imager 32, for instance, is an optical camera with a zoom function. In the present embodiment, the imager 32 is placed below the cartridge 2, i.e., on the opposite surface side of the surface where the cartridge 2 is placed on the placing table 37 and images the magnetic particles 215 coupled on the sensor area of the cartridge 2 placed on the placing table 37 by imaging from the opposite side. Also, in the present embodiment, since the communicating port 3111 is formed at the position corresponding to the imager 32, the imager 32 images the magnetic particles 215 coupled on the sensor area through the communicating port 3111 of the lower magnetic field generator 311. As shown in FIG. 2, the imager 32 includes an objective lens 321 and an image sensor 323.

The objective lens 321 is an exemplary optical system for forming the image of the magnetic particles 215 coupled to the sensor area of the cartridge 2, which is the object to be imaged, on a light receiving surface of the imaging sensor 323. In the present embodiment, the objective lens 321 is placed below the lower magnetic field generator 311, and between the lower magnetic field generator 311 and the image sensor 323.

The image sensor 323 images the magnetic particles 215 coupled on the sensor area of the cartridge 2 via the objective lens 321. The image sensor 323 may be realized by a Charge-Coupled Device (CCD) sensor or a Complementary Metal-Oxide Semiconductor (CMOS) image sensor. In the present embodiment, the image sensor 323 is placed below the objective lens 321.

The input interface 33 receives various input operations from a user, converts the received input operations into electrical signals, and outputs to the processing circuitry 36. The input interface 33 may be connected to one or more input devices such as a membrane switch, a touch panel, a touch pad, a switch, a button, a joystick, or a trackball where commands are input by touching an operating screen.

The output interface 34 is connected to the processing circuitry 36 and outputs signals supplied from the processing circuitry 36. The output interface 34 may be realized by a display circuitry, a printed circuitry, or an audio device. The display circuitry may include a CRT display, a liquid crystal display, an organic EL display, an LED display, or a plasma display, etc. Note that the processing circuitry that converts data expressing a display target to a video signal and outputs the video signal externally is included in the display circuitry. The printed circuitry may include a printer. Note that an output circuitry that outputs data expressing a printed target externally is included in the printed circuitry. The audio device may include a speaker. Note that an output circuitry that outputs audio signal externally is included in the audio device.

The memory circuitry 35 includes a recording medium that may be read by a processor, such as a magnetic or an optical recording medium or a semiconductor memory. The memory circuitry 35 stores programs executed in the circuitry of the analyzing apparatus 3 according to the present embodiment. Note that a part or all of the programs and data in a storage medium of the memory circuitry 35 may be downloaded via an electronic network.

The memory circuitry 35 also stores one or more operating programs according to the present embodiment. The operating program may include programs that define timings for executing predetermined processes necessary for measurements. The timing for executing the predetermined processes necessary for measurements, for instance, are the timing of starting and stopping applying the downward magnetic field, the timing of starting and stopping applying the upward magnetic field, the timing of imaging, or the timing of counting. These timings are obtained empirically or experimentally in advance.

The processing circuitry 36 is a processor that functions as a core of the analyzing apparatus 3. The processing circuitry 36 realizes the function corresponding to a control program by executing the operating program stored in the memory circuitry 35. Note that the processing circuitry 36 may include a memory area that stores at least a part of the data stored in the memory circuitry 35.

The processing circuitry 36 shown in FIG. 1 realizes the function corresponding to the program by executing the operating program stored in the memory circuitry 35. For instance, the processing circuitry 36 obtains a control function 361 and a counting function 362 by executing the operating program. The courting function 362 refers to a software algorithm called as a "particle analysis" that counts the number of magnetic particles from the imaged image. Note that the control function 361 and the counting function 362 are realized by a single processor in the present embodiment, but embodiments are not limited to this. For instance, each function may be realized by combining a plurality of independent processors to configure the control circuitry and let each processor execute the control program. Note that the control function 361 and the counting function 362 shown in FIG. 1 each configure a controller and a counter in the present embodiment.

If the lower magnetic field generator 311 and/or the upper magnetic field generator 312 are configured by the permanent magnet, the analyzing apparatus 3 includes the moving mechanism 38 that moves the lower magnetic field generator 311 and/or the upper magnetic field generator 312 as shown in FIG. 2. In other words, the moving mechanism 38 configured by such as an actuator moves the position of each of the lower magnetic field generator 311 and the upper magnetic field generator 312 between the position applying the magnetic field and the position applying no magnetic field. The position applying the magnetic field is a position applying the magnetic field to the magnetic particles 215 within the cartridge 2. The position applying the magnetic field, for instance, is nearby the cartridge 2. Also, the position applying no magnetic field is a position applying no attractive force by the magnetic field to the magnetic particles 215 within the cartridge 2. The position applying no magnetic field, for instance, is a position apart from the cartridge 2.

The moving mechanism 38 includes a motor etc. and may move each of the lower magnetic field generator 311 and the upper magnetic field generator 312 horizontally or vertically. By such, the moving mechanism 38 may move each of the lower magnetic field generator 311 and the upper magnetic field generator 312 from the position applying the magnetic field to the position applying no magnetic field or from the position applying no magnetic field to the position applying the magnetic field.

Figure 12:
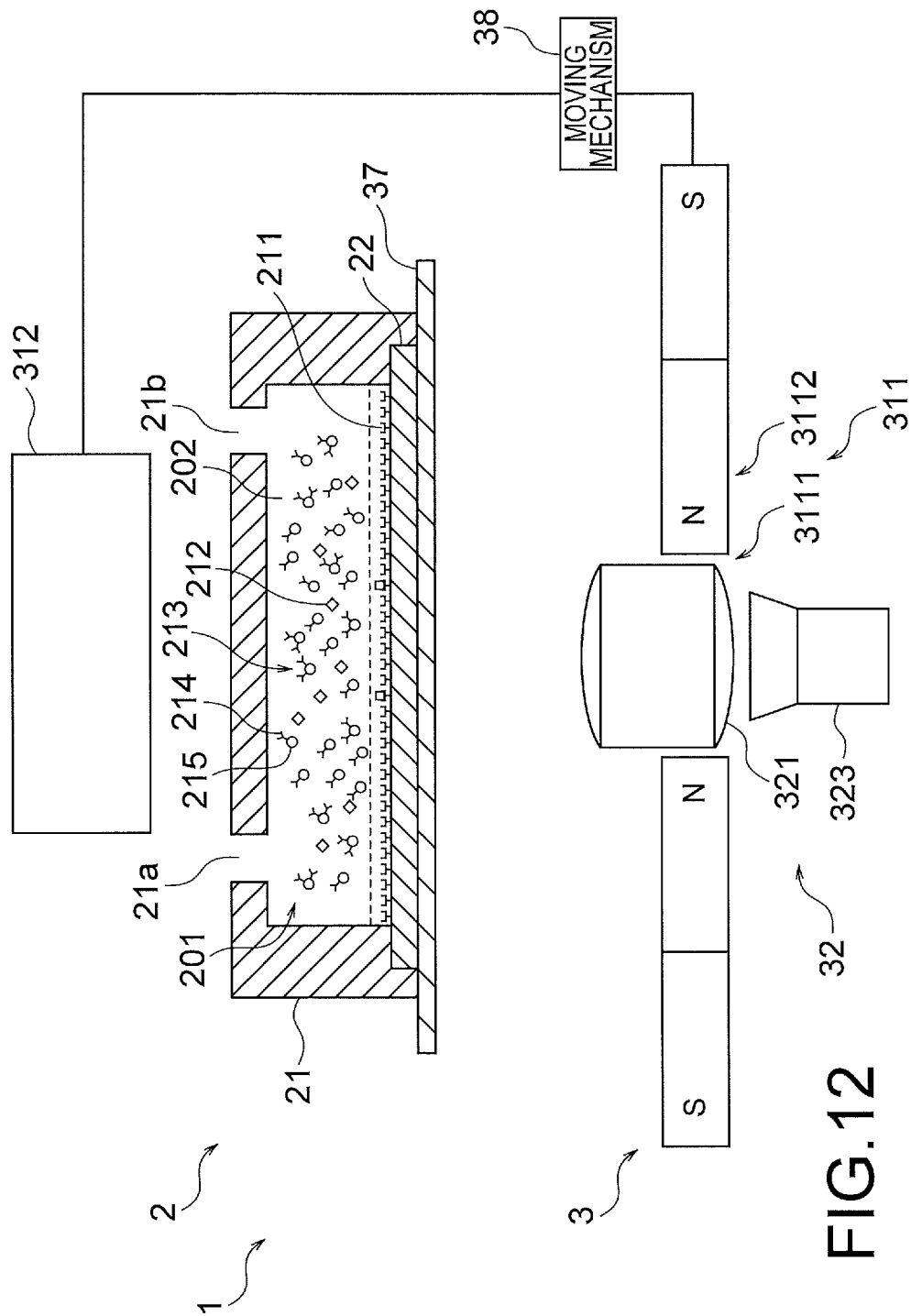
FIG. 12 is a diagram showing a state where the analyzing apparatus according to the first embodiment moves the lower magnetic field generator with a moving mechanism to a position applying no magnetic field.

FIG. 12 is a diagram showing a state where the analyzing apparatus 3 according to the present embodiment moves the lower magnetic field generator 311 with the moving mechanism 38 to the position applying no magnetic field. In the example shown in FIGS. 2 and 12, the moving mechanism 38 moves between the position applying the magnetic field shown in FIG. 2 and the position applying no magnetic field shown in FIG. 12 by vertically moving the lower magnetic field generator 311. When the moving mechanism 38 moves the lower magnetic field generator 311 to the position applying no magnetic field in the present embodiment, the moving mechanism 38 moves the lower magnetic field generator 311 to the position applying no magnetic field to insert the imager 32 into the communicating port 3111 of the lower magnetic field generator 311. Thus, in the present embodiment, a diameter of the communicating port 3111 is formed to be larger than a maximum diameter of the imager 32.

Figure 13:
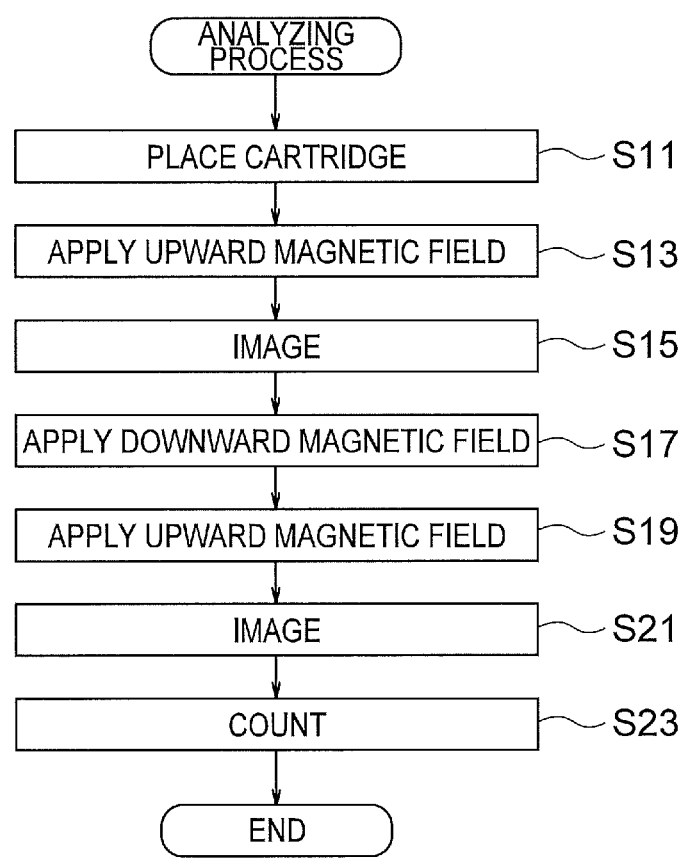
FIG. 13 is a flowchart to describe a content of an analyzing process executed in the analyzing apparatus including the moving mechanism according to the first embodiment.

FIG. 13 is a flowchart to describe a content of an analyzing process executed in the analyzing apparatus 3 including the moving mechanism according to the present embodiment. The analyzing process includes applying the upward and downward magnetic field to the cartridge 2, imaging the magnetic particles 215 coupled on the sensor area of the cartridge 2, and counting the magnetic particles 215 coupled on the sensor area of the cartridge 2. The analyzing process is a process executed when the cartridge 2 is placed on the placing table 37.

As shown in FIG. 13, the analyzing apparatus 3 first standbys until the user completes placing the cartridge 2 (Step S11). In other words, the user places the cartridge 2 on the placing table 37. Then, after placing the cartridge 2, the user completes placing the cartridge 2 by injecting the sample 202 containing the magnetic particles 215 into the cartridge 2 placed on the placing table 37. At Step S11, the lower magnetic field generator 311 and the upper magnetic field generator 312 are located on the position applying no magnetic field. Note that at Step S11, the injection of the sample 202 to the cartridge 2 may be performed automatically or manually.

Then, when placing the cartridge 2 on the analyzing apparatus 3 is complete, the analyzing apparatus 3 applies the upward magnetic field to the cartridge 2 (Step S13). The process of applying the upward magnetic field is realized by the control function 361 in the processing circuitry 36. Specifically, the analyzing apparatus 3 applies the upward magnetic field to the cartridge 2 by controlling the moving mechanism 38 to move the upper magnetic field generator 312 to the position applying the magnetic field. By such, the magnetic particles 215 may move upward without sinking when the sample 202 is introduced into the reaction vessel 201. Note that the lower magnetic field generator 311 is located on the position applying no magnetic field at Step S13. Also, the completion of placing the cartridge 2 on the analyzing apparatus 3 may be automatically detected by providing a sensor automatically detecting the completion of placing the cartridge 2 in the analyzing apparatus 3, or have the analyzing apparatus 3 detect the completion of placing the cartridge 2 by letting the user press a complete button, which is an example of the input interface 33 provided on the analyzing apparatus 3.

Next, as shown in FIG. 13, the analyzing apparatus 3 images the image (Step S15). The process of imaging is realized by the control function 361 in the processing circuitry 36. Specifically, the analyzing apparatus 3 controls the imager 32 while applying the upward magnetic field to the cartridge 2 and images the sensor area of the cartridge 2 placed on the placing table 37 of the analyzing apparatus 3. The coupling of the magnetic particles 215 right after introducing the sample 202 is imaged by the imager 32 imaging the sensor area. Note that a still image is imaged in Step S15, but moving images may be imaged as well. In other words, it is possible to start imaging the moving image at Step S15.

Next, as shown in FIG. 13, the analyzing apparatus 3 applies the downward magnetic field to the cartridge 2 (Step S17). The process of applying the downward magnetic field is realized by the control function 361 in the processing circuitry 36. Specifically, the analyzing apparatus 3 stops applying the upward magnetic field and applies the downward magnetic field to the cartridge 2 by controlling the moving mechanism 38, moving the upper magnetic field generator 312 from the position applying the magnetic field to the position applying no magnetic field, and moving the lower magnetic field generator 311 from the position applying no magnetic field to the position applying the magnetic field.

When the downward magnetic field is applied to the cartridge 2, the magnetic particles 215 scattered in the sample 202 injected to the cartridge 2 sink in the sample 202 and enters the sensor area of the reaction vessel 201. When the magnetic particles 215 sink, the magnetic particles 215 sink while coupling with the object to be detected in the sample 202 and reaches the first antibodies 211 on the sensor surface. Since the downward magnetic field is applied to the cartridge 2, a sinking speed of the magnetic particles 215 is faster compared to where no downward magnetic field is applied to the cartridge 2 and the magnetic particles 215 sink only by gravity. In other words, a time necessary to sink the magnetic particles 215 may be reduced by applying the downward magnetic field to the cartridge 2.

Next, as shown in FIG. 13, the analyzing apparatus 3 applies the upward magnetic field to the cartridge 2 (Step S19). The process of applying the upward magnetic field is realized by the control function 361 in the processing circuitry 36. Specifically, the analyzing apparatus 3 stops applying the downward magnetic field and applies the upward magnetic field to the cartridge 2 by controlling the moving mechanism 38, moving the lower magnetic field generator 311 from the position applying the magnetic field to the position applying no magnetic field, and moving the upper magnetic field generator 312 from the position applying no magnetic field to the position applying the magnetic field when a predetermined time has passed after applying the downward magnetic field at Step S17.

When the upward magnetic field is applied to the cartridge 2, the magnetic particles 215 are moved upward in the sample. However, the magnetic particles 215 coupled with the first antibodies 211 on the sensor surface with the antigen-antibody reaction, resists the upward magnetic field and remains in a state coupled with the first antibodies 211 on the sensor surface. In other words, the magnetic particles 215 coupled with the object to be detected remains in the sensor area.

Next, as shown in FIG. 13, the analyzing apparatus 3 images the image (Step S21). The process of imaging is realized by the control function 361 in the processing circuitry 36. Specifically, the analyzing apparatus 3 images the sensor area of the cartridge 2 placed on the placing table 37 on the analyzing apparatus 3. The coupling of the first antibodies 211 and the magnetic particles 215 fixed on the sensor surface is imaged by the imager 32 imaging the sensor area. Note that when the moving image was started to be imaged at Step S15, imaging is terminated at Step S21.

Next, as shown in FIG. 13, the analyzing apparatus 3 counts the number of the magnetic particles 215 (Step S23). The process of counting is realized by the counting function 362 in the processing circuitry 36. Specifically, the analyzing apparatus 3 analyzes the image imaged at Step S21, counts the number of the magnetic particles 215 left in the sensor area, and determines whether the object to be detected is included in the sample 202, and further, converts the number of particles per unit area in the image into a concentration of the object to be detected included in the sample 202 since the concentration of object to be detected included in the sample 202 is proportional to the number of particles per unit area in the image.

The analyzing process according to the present embodiment is terminated by counting the number of magnetic particles 215 at Step S23.

As described above in the analyzing system 1 according to the present embodiment, in a state where the cartridge 2 is placed on the placing table 37, since the imager 32 is provided on the opposite surface side of the surface where the cartridge 2 is placed, the communicating port 3111 is formed in front of the optical axis L1 direction of the imager 32, and the lower magnetic field generator 311 that forms the North pole, which is the first magnetic pole, around the communicating port 3111 and forms the second magnetic pole at the spaced position which is sufficiently apart from the communicating port is provided on the opposite surface side of the surface where the cartridge 2 is placed, the magnetic field generator capable of accumulating the magnetic particles 215 in the sample 202 stored in the cartridge 2 within the imaging range of the imager 32 may be placed while placing the imager 32. In other words, in the present embodiment, since the magnetic field is formed in the substantially vertical direction at the sample position, which is the position where the cartridge that stores the sample is placed, by placing the first magnetic pole of each of the plurality of bar magnets 3112 facing each other around the communicating port 3111, placing the second magnetic pole of each of the plurality of bar magnets 3112 on the circumference apart from the communicating port 3111, and placing the longitudinal direction each of the plurality of bar magnets 3112 parallel to the surface where the cartridge 2 is placed on the placing table 37, the magnetic particles 215 in the sample 202 stored in the cartridge 2 may be accumulated within the imaging range of the imager 32 and the imager 32 may image the magnetic particles 215 caught in the sensor area through the communicating port 3111. Thus, the process of sinking and rising of the magnetic particles 215 may be continuously observed.

First Modification

In the analyzing system 1 according to the first embodiment described above, the plurality of bar magnets 3112 were placed such that the longitudinal direction of each of the plurality of bar magnets 3112 were parallel to the surface where the cartridge 2 is placed on the placing table 37, but the plurality of bar magnets 3112 may be placed such that the longitudinal direction of each of the plurality of bar magnets 3112 is perpendicular to the surface where the cartridge 2 is placed on the placing table 37. Parts that differ from that of the first embodiment described above will be described below as a first modification applied to the first embodiment.

Figure 14:
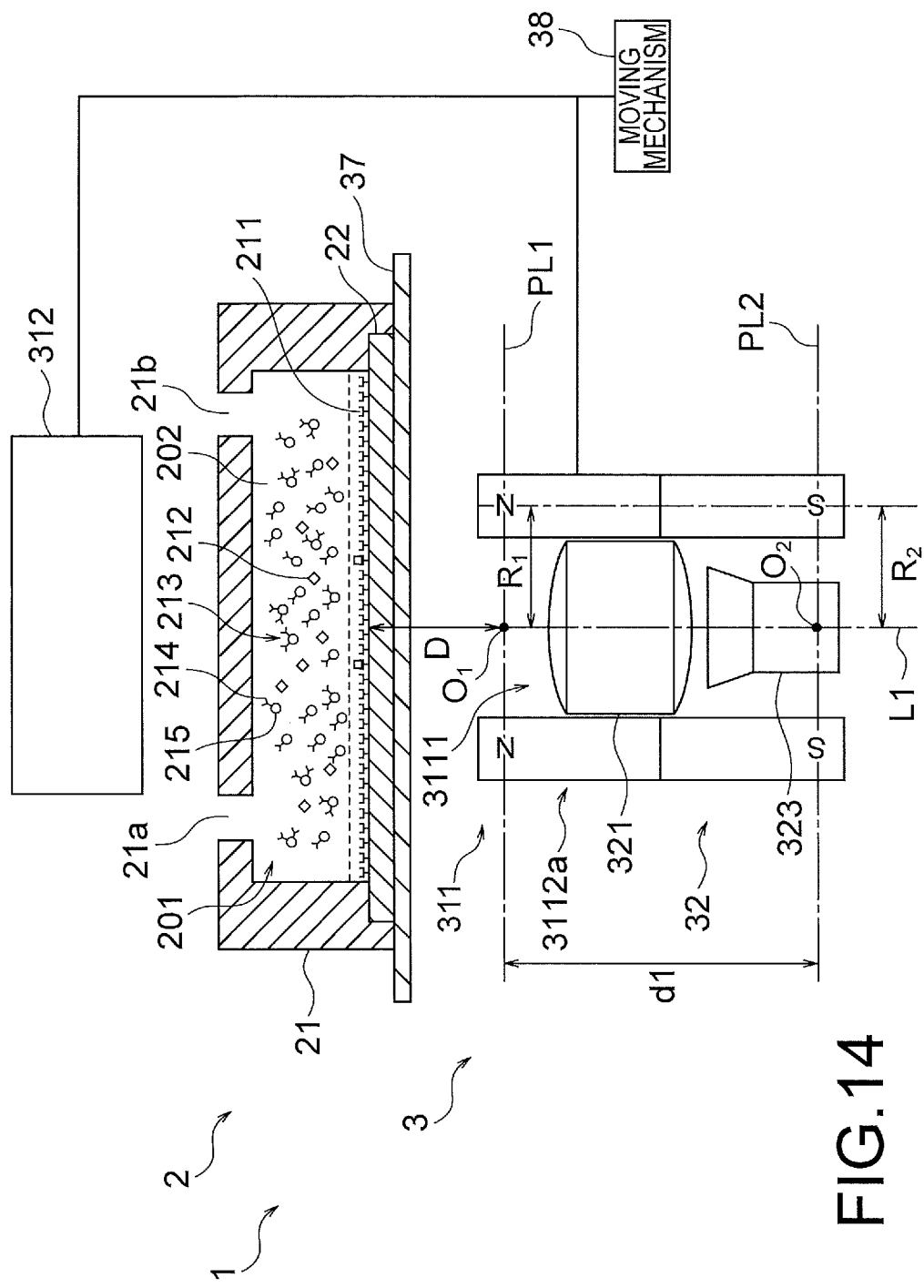
FIG. 14 is a diagram illustrating the detailed exemplary configuration of the analyzing system according to a first modification.

The exemplary configuration of the analyzing system 1 according to the first modification will be described using FIGS. 1 and 14. FIG. 14 is a diagram illustrating the detailed exemplary configuration of the analyzing system 1 according to the first modification, which corresponds to FIG. 2 of the first embodiment described above. As shown in FIGS. 1 and 14, since the configuration of the plurality of bar magnets of the lower magnetic field generator is different from that of the first embodiment, the plurality of bar magnets in the first modification will be denoted as the plurality of bar magnets 3112a. Note that the configuration and functions other than the plurality of bar magnets 3112a are equivalent to that of FIGS. 1 and 2 in the first embodiment described above and description will be omitted.

Figure 15:
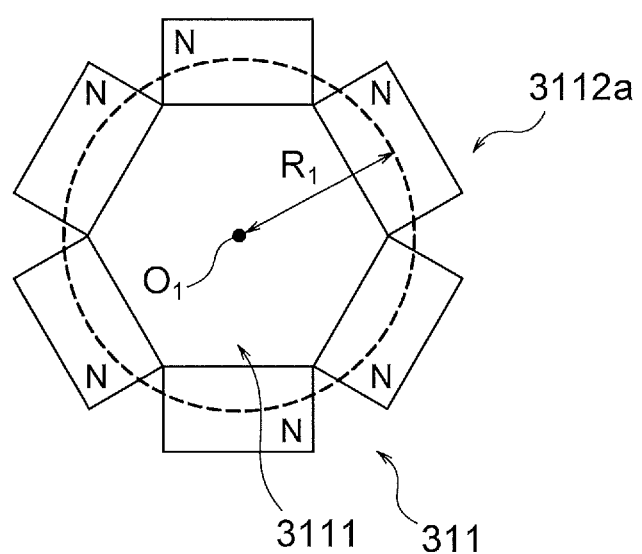
FIG. 15 is a diagram illustrating an exemplary top view of the lower magnetic field generator of the analyzing apparatus according to the first modification.

The configuration of the plurality of bar magnets 3112a will be described in detail using FIGS. 14 and 15. FIG. 15 is a diagram illustrating an exemplary top view of the lower magnetic field generator 311 of the analyzing apparatus 3 according to the first modification, which corresponds to FIG. 3A in the first embodiment described above.

Each of the plurality of bar magnets 3112a is configured by the permanent magnet. The first magnetic poles of each of the plurality of bar magnets 3112a are formed around the communicating port 3111. The second magnetic poles of different polarity from the first magnetic poles of each of the plurality of bar magnets 3112a are placed to arrange on the circumference apart from the communicating port 3111. In the present modification, as shown in FIG. 15, the plurality of bar magnets 3112a are configured by six bar magnets.

The first magnetic poles of each of the plurality of bar magnets 3112a are located in the first plane PL1. Also, the first plane PL1 is parallel to the surface where the cartridge 2 is placed on the placing table 37. The first center $O_1$ showing the center of the first plane PL1 is located on the first plane PL1. The first center $O_1$ is the center of the communicating port 3111. Further, the second magnetic poles of each of the plurality of bar magnets 3112a are located in the second plane PL2. The second center $O_2$ showing the center of the second plane PL2 is located on the second plane PL2. The first plane PL1 and the second plane PL2 are parallel. In the first modification, as shown in FIG. 14, the first center $O_1$ and the second center $O_2$ are at different positions, a line segment connecting the first center $O_1$ and the second center $O_2$ is a vertical relationship, and the first center $O_1$ and the second center $O_2$ are separated by distance d1 of the line segment. In other words, the first plane PL1 and the second plane PL2 are separated by distance d1.

In the first modification, as shown in FIGS. 14 and 15, the North poles, which is the first magnetic poles of each of the six bar magnets 3112a, are placed to arrange on the circumference with radius R 1 centered on the first center $O_1$. In other words, the North poles, which is the first magnetic poles of each of the six bar magnets 3112a, are placed to arrange around the communicating port 3111. As such, the lower magnetic field generator 311 generates the downward magnetic field by forming the North poles, which are the first magnetic poles, around the communicating port 3111.

Also, in the first modification, as shown in FIGS. 14 and 15, the South poles, which are the second magnetic poles of each of the six bar magnets 3112a, are placed to arrange on the circumference of radius $R_2$ centered on the second center $O_2$ with the same size as radius $R_1$. In other words, the South poles, which are the second magnetic poles of each of the six bar magnets 3112a, are placed to arrange on the circumference apart from the communicating port 3111.

Further in the first modification, since the first magnetic poles of each of the plurality of bar magnets 3112a are in the first plane PL1, the second magnetic poles of each of the plurality of bar magnets 3112a are in the second plane PL2, the first plane PL1 and the second plane PL2 are separated apart by distance d1, and radius $R_1$ and radius $R_2$ are same, in the present modification, the plurality of bar magnets 3112a are placed such that the longitudinal direction of each of the plurality of bar magnets 3112a is perpendicular to the surface where the cartridge 2 is placed on the placing table 37.

Note that the lower magnetic field generator 311 includes six bar magnets in the example shown in FIG. 15, but the lower magnetic field generator 311 may have an arbitrary number of bar magnets. For instance, the lower magnetic field generator 311 may be configured to have two or more and five or less magnets or have seven or more magnets.

Also, although the cross-sectional shape of the bar magnets of the lower magnetic field generator 311 is rectangular in the example shown in FIG. 15, the cross-sectional shape of the bar magnets of the lower magnetic field generator 311 is not limited to being rectangular. In other words, the bar magnets may have an arbitrary cross-sectional shape such as round or oval.

Also, each of the plurality of bar magnets 3112a is placed in contact with each other in the example shown in FIG. 15, but embodiments are not limited to this. Each of the plurality of bar magnets 3112a may be spaced apart from each other. In other words, the communicating port 3111 may be formed by placing each of the plurality of bar magnets 3112a in contact with each other or by placing each of the plurality of bar magnets 3112a apart from each other.

As described above, in the analyzing system 1 according to the first modification, since the magnetic field is formed in the substantially vertical direction at the sample position, which is the position where the cartridge 2 that stores the sample 202 is placed in the placing table 37, by placing the first magnetic poles of each of the plurality of bar magnets 3112a around the communicating port 3111, placing the second magnetic poles of each of the plurality of bar magnets 3112a on the circumference apart from the communicating port 3111, and placing the plurality of bar magnets 3112a such that the longitudinal direction of each of the plurality of bar magnets 3112a are perpendicular to the surface where the cartridge 2 is placed on the placing table 37, the magnetic particles 215 in the sample 202 stored in the cartridge 2 may be accumulated within the imaging range of the imager 32, and the imager 32 may image the magnetic particles 215 caught in the sensor area through the communicating port 3111. Thus, the process of sinking and rising of the magnetic particles 215 may be continuously observed.

Second Modification

In the analyzing system 1 according to the first embodiment described above, the plurality of bar magnets 3112 was placed such that the longitudinal direction of each of the plurality of bar magnets 3112 was parallel to the surface where the cartridge 2 is placed on the placing table 37, but the plurality of bar magnets 3112 may be modified such that the longitudinal direction of each of the plurality of bar magnets 3112 is slanted against the surface where the cartridge 2 is placed on the placing table 37. Parts that differ from the first embodiment described above will be described as a second modification applied to the first embodiment.

Figure 16:
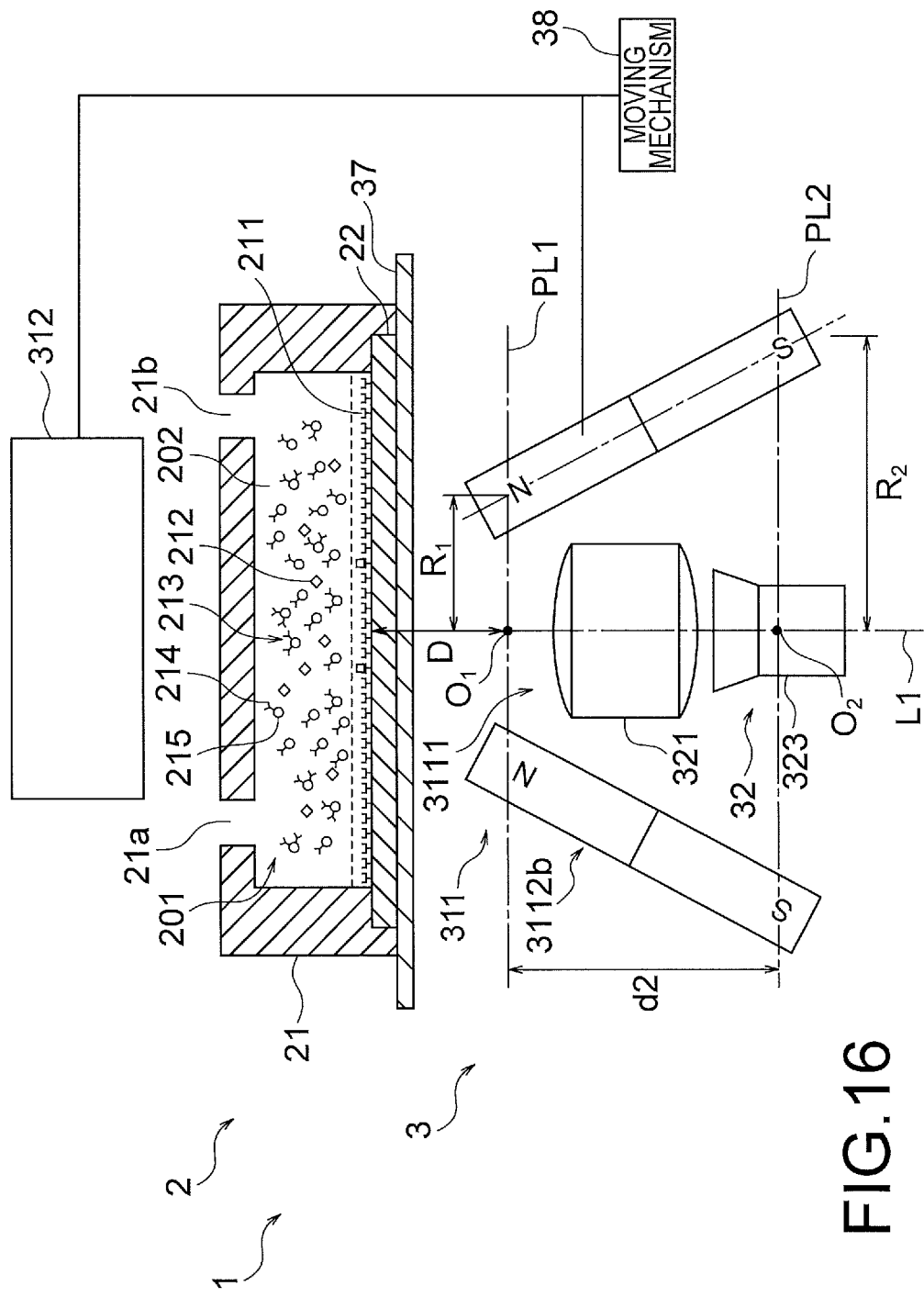
FIG. 16 is a diagram illustrating the detailed exemplary configuration of the analyzing system according to a second modification.

The exemplary configuration of the analyzing system 1 according to the second modification will be described using FIGS. 1 and 16. FIG. 16 is a diagram illustrating the detailed exemplary configuration of the analyzing system 1 according to the second modification, which corresponds to FIG. 2 in the first embodiment described above. As shown in FIGS. 1 and 16, since the configuration of the plurality of bar magnets of the lower magnetic field generator is different from that of the first embodiment, the plurality of bar magnets in the first modification will be denoted as the plurality of bar magnets 3112b. Note that the configuration and functions other than the plurality of bar magnets 3112b are equivalent to that of FIGS. 1 and 2 in the first embodiment described above and description will be omitted.

Each of the plurality of bar magnets 3112b is configured by the permanent magnet. The first magnetic pole of each of the plurality of bar magnets 3112b is formed around the communicating port 3111. The second magnetic poles of different polarity from the first magnetic poles of each of the plurality of bar magnets 3112b are placed to arrange on the circumference apart from the communicating port 3111.

The first magnetic poles of each of the plurality of bar magnets 3112b are located in the first plane PL1. Also, the first plane PL1 is parallel to the surface where the cartridge 2 is placed on the placing table 37. The first center $O_1$ showing the center of the first plane PL1 is located on the first plane PL1. The first center $O_1$ is the center of the communicating port 3111. Further, the second magnetic poles of each of the plurality of bar magnets 3112*b* are located in the second plane PL2. The second center $O_2$ showing the center of the second plane PL2 is located on the second plane PL2. The first plane PL1 and the second plane PL2 are parallel. In the second modification, as shown in FIG. 16, the first center $O_1$ and the second center $O_2$ are at different positions, a line segment connecting the first center $O_1$ and the second center $O_2$ is a vertical relationship, and the first center $O_1$ and the second center $O_2$ are separated by distance d2 of the line segment. In other words, the first plane PL1 and the second plane PL2 are separated by distance d2.

In the second modification, as shown in FIG. 16, the first magnetic poles of each of the plurality of bar magnets 3112*b* are placed to arrange on the circumference of radius $R_1$ centered on the first center $O_1$. In other words, the North poles, which are the first magnetic poles of each of the plurality of bar magnets 3112*b*, are placed to arrange around the communicating port 3111. As such, the lower magnetic field generator 311 generates the downward magnetic field by forming the North poles, which are the first magnetic poles, around the communicating port 3111.

Also in the second modification, as shown in FIG. 16, the South poles, which are the second magnetic poles of each of the plurality of bar magnets 3112*b*, are placed to arrange on the circumference centered on the second center $O_2$ of radius $R_2$ larger than radius $R_1$. In other words, the South poles, which are the second magnetic poles of each of the plurality of bar magnets 3112*b*, are placed to arrange on the circumference apart from the communicating port 3111.

Further, in the second modification, since the first magnetic poles of each of the plurality of bar magnets 3112*b* are in the first plane PL1, the second magnetic poles of each of the plurality of bar magnets 3112*b* are in the second plane PL2, the first plane PL1 and the second plane PL2 are separated by distance d2, and radius $R_2$ is larger than radius $R_1$, the plurality of bar magnets 3112*b* is placed such that the longitudinal direction of each of the plurality of bar magnets 3112*b* is slanted against the surface where the cartridge 2 is placed on the placing table 37.

As described above, in the analyzing system 1 according to the second modification, since the magnetic field is formed in the substantially vertical direction at the sample position, which is the position where the cartridge 2 that stores the sample 202 is placed on the placing table 37, by placing the first magnetic poles of each of the plurality of bar magnets 3112*b* around the communicating port 3111, placing the second magnetic poles of each of the plurality of bar magnets 3112*b* on the circumference apart from the communicating port 3111, and placing the plurality of bar magnets 3112*b* such that the longitudinal direction of each of the plurality of bar magnets 3112*b* is slanted against the surface where the cartridge 2 is placed on the placing table 37, the magnetic particles 215 in the sample 202 stored in the cartridge 2 may be accumulated within the imaging range of the imager 32, and the imager 32 may image the magnetic particles 215 caught in the sensor area through the communicating port 3111. Thus, the process of sinking and rising of the magnetic particles 215 may be continuously observed.

Second Embodiment

In the analyzing system 1 according to the first embodiment described above, the bar magnets configured the lower magnetic field generator 311, but the shape of the magnets is not limited to this. In a second embodiment, an annular magnet may configure the lower magnetic field generator. Parts that differ from that of the first embodiment described above will be described.

Figure 17:
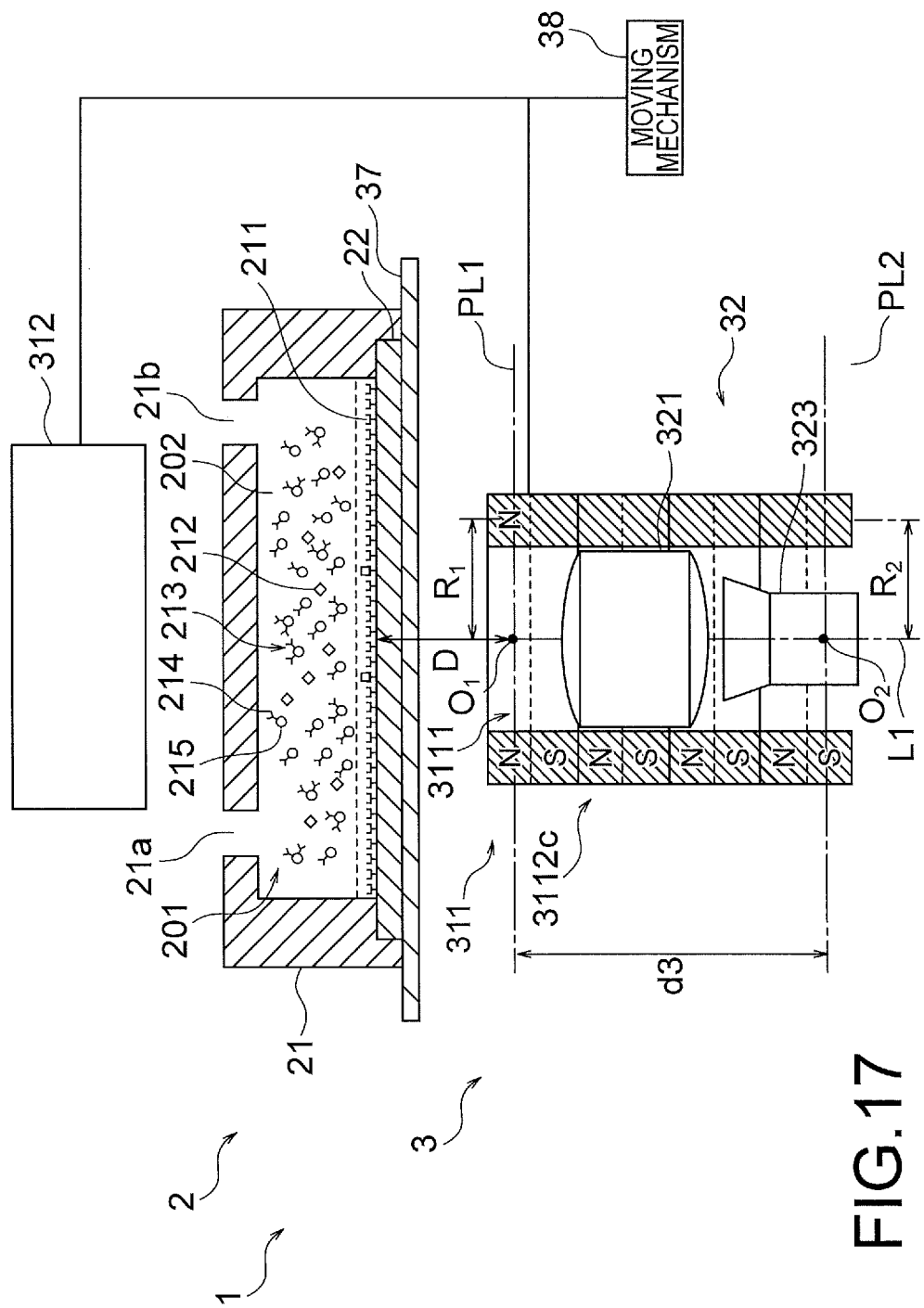
FIG. 17 is a diagram illustrating the detailed exemplary configuration of the analyzing system according to a second embodiment.

The exemplary configuration of the analyzing system 1 according to the second embodiment will be described using FIGS. 1 and 17. FIG. 17 is a diagram illustrating the detailed exemplary configuration of the analyzing system 1 according to the second embodiment, which corresponds to FIG. 2 in the first embodiment described above. As shown in FIGS. 1 and 17, since the configuration of the magnets of the lower magnetic field generator differs from that of the first embodiment, the magnets will be denoted as an annular magnet 3112*c* in the second embodiment. Note that the configuration and functions other than the annular magnet 3112*c* are equivalent to that of FIGS. 1 and 2 in the first embodiment described above and description will be omitted.

Figure 18:
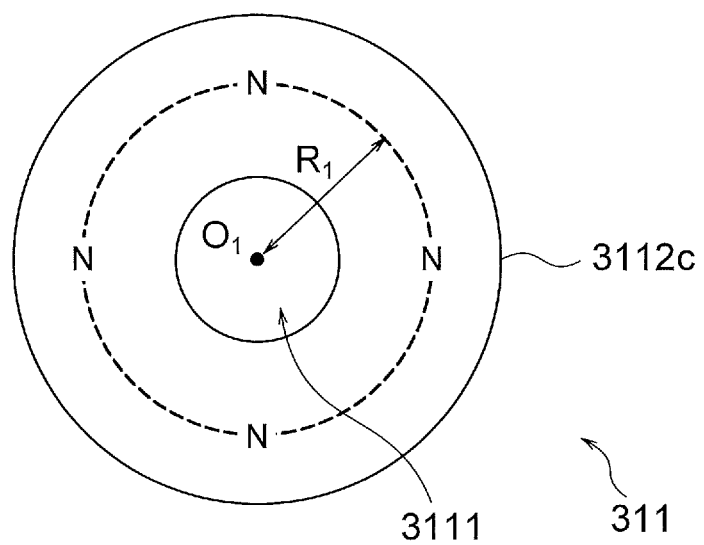
FIG. 18 is a diagram illustrating an exemplary top view of the lower magnetic field generator of the analyzing apparatus according to the second embodiment.

The configuration of the annular magnet 3112*c* will be described in detail referring to FIGS. 17 and 18. FIG. 18 is a diagram illustrating an exemplary top view of the lower magnetic field generator 311 of the analyzing apparatus 3 according to the second embodiment, which corresponds to FIG. 3A in the first embodiment described above.

The annular magnet 3112*c* is configured by the permanent magnet. The first magnetic pole of the annular magnet 3112*c* is continuously formed around the communicating port 3111. Also, the second magnetic pole of the annular magnet 3112*c* of different polarity from the first magnetic pole is continuously formed in the direction perpendicular to the surface where the cartridge 2 is placed on the placing table 37 and below the first magnetic pole. In the present embodiment, the annular magnet 3112*c* is formed by stacking a plurality of annular magnet pieces in the direction perpendicular to the surface where the cartridge 2 is placed on the placing table 37. Specifically, the annular magnet 3112*c* is formed by stacking four annular magnet pieces. When the annular magnet 3112*c* is formed by stacking the plurality of annular magnet pieces, the annular magnet 3112*c* is formed by bonding and stacking each different poles of each of the plurality of annular magnet pieces. Thus, in the present embodiment, the North pole, which is the first magnetic pole, is formed on one end in the vertical direction of the four annular magnet pieces, and the South pole, which is the second magnetic pole, is formed on the other end in the vertical direction of the four annular magnet pieces.

Also, in the present embodiment, the imager 32 is placed on an interior of the annular magnet 3112. Thus, an internal diameter of the annular magnet 3112 is formed to be larger than the maximum outer diameter of the imager 32.

The first magnetic pole of the annular magnet 3112*c* is located in the first plane PL1. Also, the first plane PL1 is parallel to the surface where the cartridge 2 is placed on the placing table 37. The first center $O_1$ showing the center of the first plane PL1 is located on the first plane PL1. The first center $O_1$ is the center of the communicating port 3111. Further, the second magnetic poles of the annular magnet 3112*c* is located in the second plane PL2. The second center $O_2$ showing the center of the second plane PL2 is located on the second plane PL2. The first plane PL1 and the second plane PL2 are parallel. In the second embodiment, as shown in FIG. 17, the first center $O_1$ and the second center $O_2$ are at different positions, a line segment connecting the first center $O_1$ and the second center $O_2$ is a vertical relationship, and the first center $O_1$ and the second center $O_2$ are separated by distance d3 of the line segment. In other words, the first plane PL1 and the second plane PL2 are separated by distance d3.

In the second embodiment, as shown in FIGS. 17 and 18, the North pole, which is the first magnetic pole of the annular magnet 3112c, is continuously formed along the circumference of radius $R_1$ centered on the first center $O_1$. As such, the lower magnetic field generator 311 generates the downward magnetic field by forming the North pole, which is the first magnetic pole, around the communicating port 3111. Also, the South pole, which is the second magnetic pole of the annular magnet 3112c, is continuously formed along the circumference of radius $R_2$ centered on the first center $O_2$.

Note that the lower magnetic field generator 311 has four annular magnet pieces in the example shown in FIG. 18, but the number of annular magnet pieces of the lower magnetic field generator 311 may be arbitrary. For instance, the lower magnetic field generator 311 may be configured to have three or less magnet pieces or have five or magnet pieces.

Also, although the cross-sectional shape of the annular magnet of the lower magnetic field generator 311 is circular in the example shown in FIG. 18, the cross-sectional shape of the annular magnet of the lower magnetic field generator 311 is not limited to be circular. In other words, the cross-sectional shape of the annular magnet is arbitrary and may have cross-sectional shapes such as rectangular or elliptical.

Figure 19:
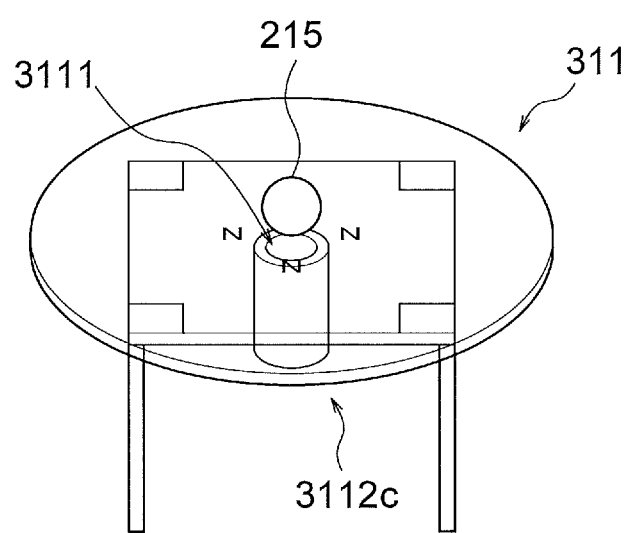
FIG. 19 is a perspective view illustrating the attraction position of the magnetic particle in the configuration of the lower magnetic field generator according to the second embodiment.
Figure 20:
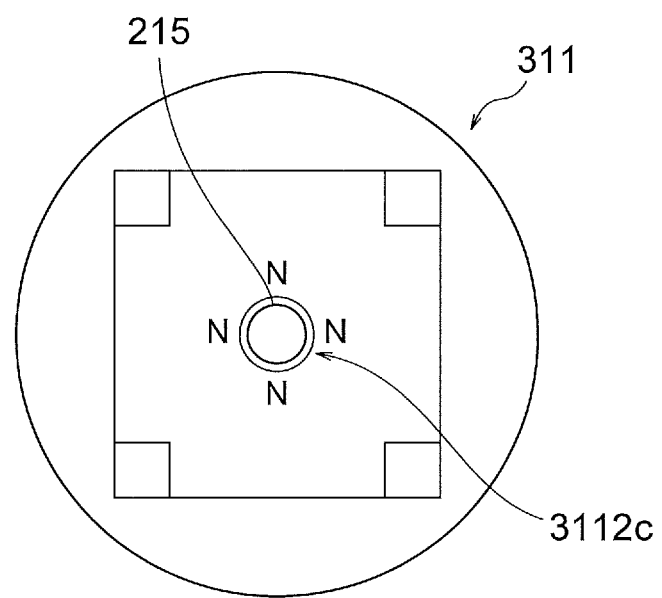
FIG. 20 is a top view illustrating the attraction position of the magnetic particle in the configuration of the lower magnetic field generator according to the second embodiment.
Figure 21:
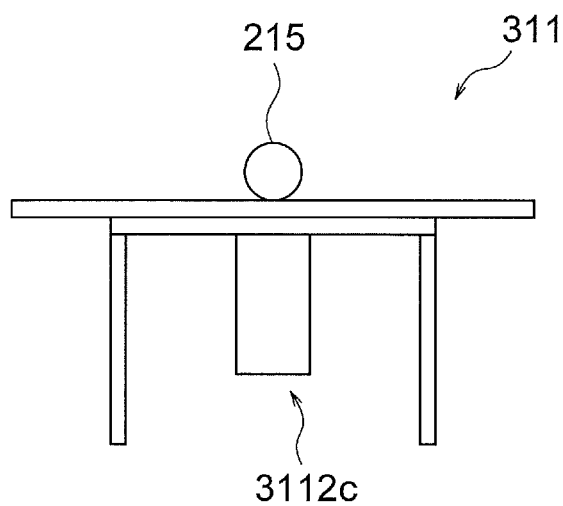
FIG. 21 is a side view illustrating the attraction position of the magnetic particle in the configuration of the lower magnetic field generator according to the second embodiment.

The attraction position of the magnetic particles 215 in the configuration of the lower magnetic field generator 311 according to the present embodiment and the attraction position of the magnetic particles 215 in the configuration of the lower magnetic field generator according to the comparative example will be described referring to FIGS. 5 and 19 to 21. FIGS. 19 to 20 are figures illustrating the attraction position of magnetic particles 215 in the configuration of the lower magnetic field generator 311 according to the present embodiment. In FIGS. 19 to 21, the magnetic particles 215 is deliberately exaggerated and drawn large for ease of understanding of the attraction position of the magnetic particles 215.

As shown in FIG. 5, the lower magnetic field generator according to the comparative example is the flat and annular magnet, the North pole, which is the first magnetic pole, is formed above the annular magnet, and the South pole, which is the second magnetic pole, is formed below the annular magnet. As such, in the lower magnetic field generator according to the comparative example, the South pole is formed without separation from the North pole. Thus, as shown in FIG. 5, the magnetic particles 215 are attracted above the North pole. Thus, it may be difficult for the imager 32 to image the magnetic particles 215 through the communicating port 3111, making the measurement results of the analyzing apparatus 3 less accurate.

On the other hand, in the lower magnetic field generator 311 according to the present embodiment, the North pole, which is the first magnetic pole of the annular magnet 3112c, is continuously formed around the communicating port 3111. Also, the South pole, which is the second magnetic pole of different polarity from the first pole, is placed in direction perpendicular to the surface where the cartridge 2 is placed on the placing table 37, below the first magnetic pole, apart from the communicating port 3111, and so that the magnetic field in a substantially vertical direction is formed at the sample position, which is the position where the cartridge 2 that stores the sample 202 is placed on the placing table 37. In other words, the magnetic field generated by the South pole, which is the second magnetic pole of the annular magnet 3112c, does not affect the magnetic field of the first magnetic pole formed around the communicating port 3111 and the South pole, which is the second magnetic pole of the annular magnet 3112c, is continuously formed at the spaced position which is apart from the communicating port 3111. As such, unlike the lower magnetic field generator according to the comparative example, the South pole, which is the second magnetic pole, is formed apart from the North pole, which is the first magnetic pole in the lower magnetic field generator 311 according to the present embodiment.

By such, as shown in FIGS. 19 to 21, the magnetic particles 215 may be attracted above the communicating port 3111. For this reason, since the magnetic particles may be accumulated within the imaging range of the imager 32 and the imager 32 may image the magnetic particles 215 through the communicating port 3111, the measurement results of the analyzing apparatus 3 becomes more accurate compared to the lower magnetic field generator 311 according to the comparative example.

Here, the spaced position which is apart from the communicating port 3111, where the second magnetic pole is formed, and which does not affect the magnetic field of the first magnetic pole formed around the communicating port 3111, for instance, is a position where the distance from the first to the second magnetic pole is sufficiently larger than the distance from the first center $O_1$, which is the center of the communicating port 3111, to the first magnetic pole. In the present embodiment, the distance from the first to the second magnetic pole, for instance, is the distance from the end face of the first magnetic pole to the end face of the second magnetic pole. The distance from the first to the second magnetic pole being sufficiently larger than the distance from the first center $O_1$, which is the center of the communicating port 3111, to the first magnetic pole, for instance, is a position where the distance from the first to the second magnetic pole is three times or more the distance from the center $O_1$, which is the center of the communicating port 3111, to the first magnetic pole. In other words, in the present embodiment, the distance from the first to the second magnetic pole is three times or more the radius $R_1$. If the distance from the first to the second magnetic pole is less than three times the distance from the first center $O_1$, which is the center of the communicating port 3111, to the first magnetic pole, the magnetic particles 215 stored in the cartridge 2 cannot be attracted to the magnetic field area A2 since the magnetic field in the substantially vertical direction as shown in FIG. 6 is not formed at the sample position, which is the position where the cartridge 2 that stores the sample is placed on the placing table 37.

Note that the distance from the first to the second magnetic pole was defined as the distance from the end face of the first magnetic pole to the end face of the second magnetic pole, but the distance between the first to the second magnetic pole is not limited to this. In other words, the distance from the first to the second magnetic pole may be defined arbitrarily, and for instance, the distance d3 between the first plane PL1 where the first magnetic pole is located and the second plane PL2 where the second magnetic pole is located may be defined as the distance from the first to the second magnetic pole.

As described above, in the analyzing system 1 according to the present embodiment, in a state where the cartridge 2 is placed on the placing table 37, since the imager 32 is provided on the opposite surface side of the surface where the cartridge 2 is placed, the communicating port 3111 is formed in front of the optical axis L1 direction of the imager 32, and the lower magnetic field generator 311 that continuously forms the first magnetic pole around the communicating port 3111 and continuously forms the second magnetic pole at the spaced position which is apart from the communicating port 3111 is provided on the opposite surface side of the surface where the cartridge 2, the magnetic field generator capable of accumulating the magnetic particles 215 in the sample 202 stored in the cartridge 2 within the imaging range of the imager 32 may be placed while placing the imager 32. In other words, in the present embodiment, since the magnetic field is formed in the substantially vertical direction at the sample position, which is the position where the cartridge that stores the sample 202 is placed, by continuously forming the first magnetic pole of the annular magnet 3112c along the communicating port 3111 and continuously forming the second magnetic pole of the annular magnet 3112c at the spaced position which is apart from the communicating port 3111, the magnetic particles 215 in the sample 202 stored in the cartridge 2 may be accumulated within the imaging range of the imager 32, and the imager 32 may image the magnetic particles 215 caught in the sensor area through the communicating port 3111. Thus, the process of sinking and rising of the magnetic particles 215 may be continuously observed.

Third Modification

Although the lower magnetic field generator 311 was configured by the permanent magnet in the first and second embodiments described above, the lower magnetic field generator 311 may also be configured by the electromagnet. Parts that differ from that of the first embodiment described above will be described below as a third modification applied to the first embodiment.

Figure 22:
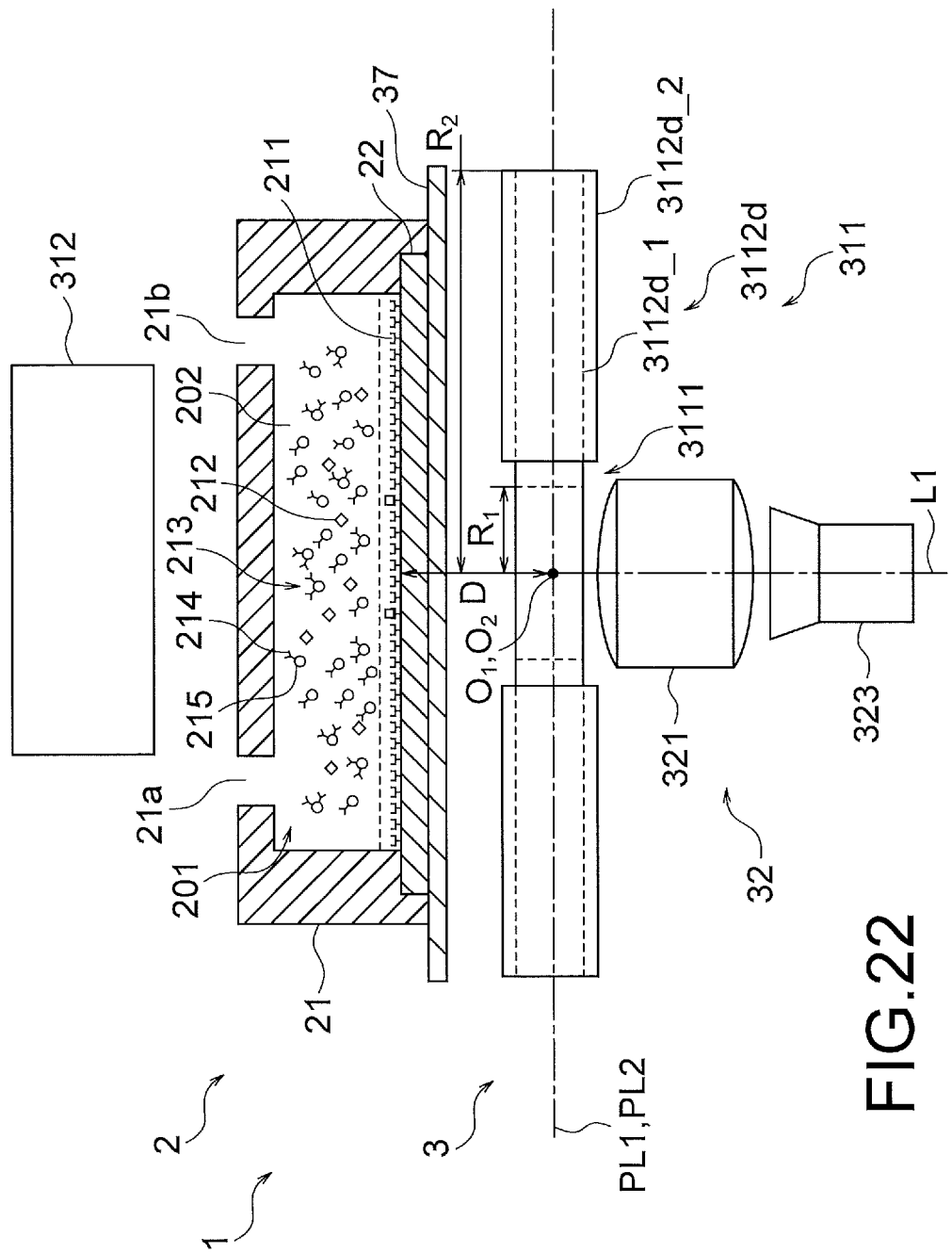
FIG. 22 is a diagram illustrating the detailed exemplary configuration of the analyzing system according to a third modification.

The exemplary configuration of the analyzing system 1 according to the third modification will be described using FIGS. 1 and 22. FIG. 22 is a diagram illustrating the detailed exemplary configuration of the analyzing system 1 according to the third modification, which corresponds to FIG. 2 in the first embodiment described above. As shown in FIGS. 1 and 22, since the configuration of the plurality of bar magnets differs from that of the first embodiment, the plurality of bar magnets in the third modification will be denoted as the plurality of bar magnets 3112d. Also, the lower magnetic field generator 311 may not have the moving mechanism 38 when the plurality of bar magnets is configured by the electromagnet. Note that the configuration and functions other than the plurality of bar magnets 3112d and the moving mechanism 38 are equivalent to that of FIGS. 1 and 2 in the first embodiment described above and description will be omitted.

Figure 23:
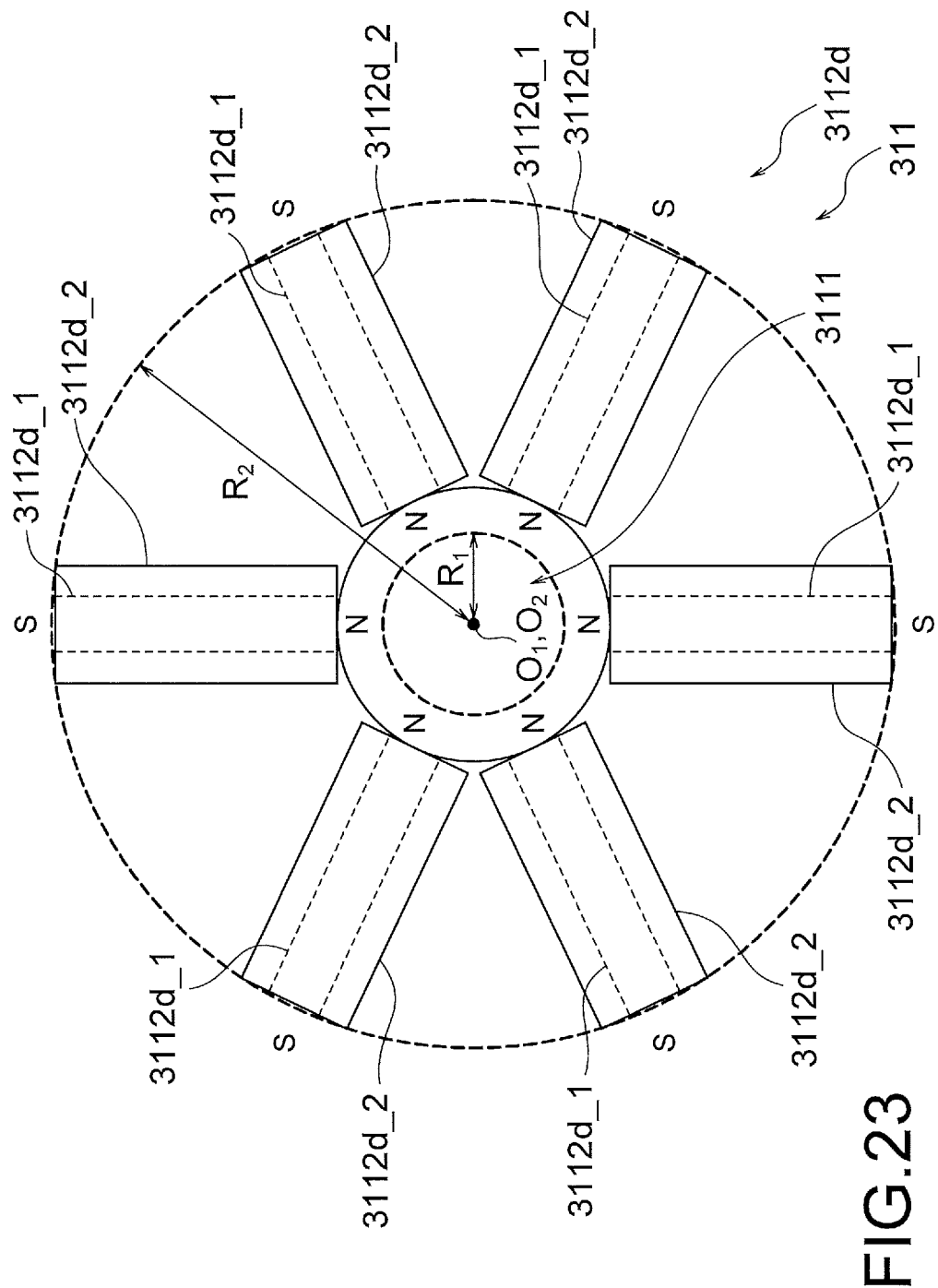
FIG. 23 is a diagram illustrating an exemplary top view of the lower magnetic field generator of the analyzing apparatus according to the third modification.

The configuration of the plurality of bar magnets 3112d will be described in detail referring to FIGS. 22 and 23. FIG. 23 is a diagram illustrating an exemplary top view of the lower magnetic field generator 311 of the analyzing apparatus 3 according to the third modification, which corresponds to FIG. 3A in the first embodiment described above.

In the present modification, each of the plurality of bar magnets 3112d is configured by the electromagnet and applies the downward magnetic field to the cartridge 2 by turning the magnetic field ON/OFF under the control of the control circuitry 36. Each of the plurality of bar magnets 3112d includes a magnetic core 3112d_1 and a coil 3112d_2.

A plurality of magnetic cores 3112d_1 is provided and placed around the communicating port 3111 of the lower magnetic field generator 311. One ends of each of the plurality of magnetic cores 3112d_1 is placed around the communicating port 3111. Another end of each of the plurality of magnetic cores 3112d_1 is placed to arrange on the circumference apart from the communicating port 3111.

In the present modification, one ends of the plurality of magnetic cores 3112d_1 is coupled to the annular magnetic core. Further, in the present modification, six magnetic cores 3112d_1 are provided as shown in FIG. 23.

The coil 3112d_2 is wound around each of the plurality of magnetic cores 3112d_1. The magnetic field is generated in a certain direction and the one ends and the other ends of each of the plurality of magnetic cores 3112d_1 are magnetized to different magnetic poles by letting current flow in the coil 3112d_2. In the present modification, as shown in FIG. 23, the one ends of each of the plurality of magnetic cores 3112d_1 is magnetized to the North pole, which is the first magnetic pole, and the other ends of each of the plurality of magnetic cores 3112d_1 is magnetized to the South pole, which is the second magnetic pole, by letting current flow in the coil 3112d_2.

The one ends of each of the plurality of bar magnets 3112d are located in the first plane PL1. Also, the first plane PL1 is parallel to the surface where the cartridge 2 is placed on the placing table 37. The first center $O_1$ showing the center of the first plane PL1 is located on the first plane PL1. The first center $O_1$ is the center of the communicating port 3111. Also, the other ends of each of the plurality of bar magnets 3112d are located in the second plane PL2. The second center $O_2$ showing the center of the second plane PL2 is located on the second plane PL2. The first plane PL1 and the second plane PL2 are parallel. In the present modification, the first plane PL1 matches with the second plane PL2 since the first center $O_1$ matches with the second center $O_2$.

In the present modification, as shown in FIGS. 22 and 23, the one ends of each of the six magnetic cores 3112d_1 are placed along the circumference of radius $R_1$ centered on the first center $O_1$. In other words, the one ends of each of the six magnetic cores 3112d_1 are placed to arrange around the communicating port 3111 as the North poles, which are the first magnetic poles, by turning the magnetic field ON. As such, the lower magnetic field generator 311 generates the downward magnetic field by forming the North poles, which are the first magnetic poles, around the communicating port 3111 under the control of the processing circuitry 36.

Also, in the present modification, as shown in FIGS. 22 and 23, the other ends of each of the six magnetic cores 3112d_1 are placed along the circumference of radius $R_2$ centered on the second center $O_2$. In other words, the ends of each of the six magnetic cores 3112d_1 are placed to arrange around the communicating port 3111 as the South poles, which are the second magnetic poles, by turning the magnetic field ON.

Further, in the present modification, since the one ends of each of the plurality of bar magnets 3112d are located in the first plane PL1, the other ends of each of the plurality of bar magnets 3112d are located in the second plane PL2, and the first plane PL1 and the second plane PL2 match, the plurality of bar magnets 3112d are placed such that the longitudinal direction of each of the plurality of bar magnets 3112d is parallel to the surface where the cartridge 2 is placed on the placing table 37.

Note that in the present modification, the plurality of bar magnets 3112d was placed such that the longitudinal direction of each of the plurality of bar magnets 3112d is parallel to the surface where the cartridge 2 is placed on the placing table 37, but the plurality of bar magnets 3112d may be placed such that the longitudinal direction of each of the plurality of bar magnets 3112d is perpendicular to or slanted against the surface where the cartridge 2 is placed on the placing table 37.

Also, in the example shown in FIG. 23, although the magnet 3112d has six magnetic cores 3112d_1, the magnet 3112d may have an arbitrary number of magnetic cores 3112d_1. For instance, the magnet 3112d may be configured to have two or more and five or less magnetic cores 3112d_1 or have seven or more magnetic cores 3112d_1.

Further, although the cross-sectional shape of the magnetic core 3112d_1 of the magnet 3112d is circular in the example shown in FIG. 23, the cross-sectional shape of the magnetic core 3112d_1 of the magnet 3112d is not limited to be circular. In other words, the cross-sectional shape of the magnetic core 3112d_1 of the magnet 3112d is arbitrary and may be rectangular or elliptical cross-sectional shapes. Note that the magnetic field lines and the attraction position of the magnetic particles 215 in the configuration of the lower magnetic field generator 311 according to the third modification corresponds to the magnetic field lines and the attraction position of the magnetic particles 215 in the configuration of the lower magnetic field generator 311 according to the first embodiment, and description will be omitted.

Figure 24:
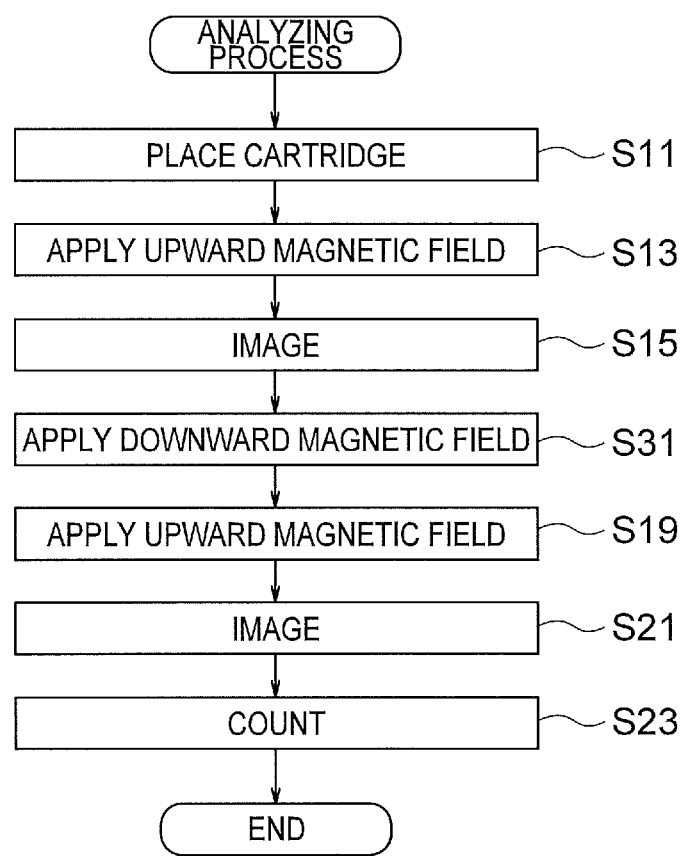
FIG. 24 is a flowchart to describe contents of the analyzing process executed in the analyzing apparatus including the moving mechanism according to the third modification.

FIG. 24 is a flowchart to describe contents of the analyzing process executed in the analyzing apparatus 3 including the moving mechanism according to the third modification. The analyzing process includes applying the upward and downward magnetic fields to the cartridge 2, imaging the magnetic particles 215 coupled on the sensor area of the cartridge 2, and counting the magnetic particles 215 coupled on the sensor area of the cartridge 2. The analyzing process is a process executed when the cartridge 2 is placed on the placing table 37. Note that the process from Step S11 to Step S15 shown in FIG. 24 corresponds to that of FIG. 13 in the first embodiment described above, and description will be omitted.

When placing the cartridge 2 on the analyzing apparatus 3 at Step S11 is completed, the analyzing apparatus 3 applies the downward magnetic field to the cartridge 2 (Step S31). The process of applying the downward magnetic field to the cartridge 2 is realized by the control function 361 in the processing circuitry 36. Specifically, the analyzing apparatus 3 stops applying the upward magnetic field by moving the upper magnetic field generator 312 from the position applying the magnetic field to the position applying no magnetic field, let current flow in the coil 3112d_2 wound around each of the plurality of magnetic cores 3112d_1, generates the downward magnetic field by magnetizing the one ends of the magnetic cores 3112d_1 to the North poles, which are the first magnetic poles and magnetizing the other ends of the magnetic cores 3112d_1 to the South pole, which are the second poles, and applies the downward magnetic field to the cartridge 2. Note that the process after Step S31 shown in FIG. 24 corresponds to that of FIG. 13 in the first embodiment described above and description will be omitted.

Then, the analyzing process according to the present modification is terminated by counting the number of the magnetic particles 215 at Step S23.

As described above, in the analyzing system 1 according to the present modification, since the magnetic field is formed in the substantially vertical direction at the sample position, which is the position where the cartridge that stores the sample is placed, by configuring the plurality of bar magnets 3112d with the electromagnet, placing the one ends of each of the plurality of magnetic cores 3112d_1 around the communicating port 3111, placing the other ends of each of the plurality of magnetic cores 3112d_1 on the circumference at the spaced position which is apart from the communicating port 3111, placing the plurality of bar magnets 3112d_1 such that the longitudinal direction of each of the plurality of magnetic cores 3112d_1 is parallel to the surface where the cartridge 2 is placed on the placing table 37, and letting current flow in the coil 3112d_2 wound around each of the plurality of magnetic cores 3112d, the magnetic particles 215 in the sample 202 stored in the cartridge 2 may be accumulated in the sensor area above the communicating port 3111 and the imager 32 may image the magnetic particles 215 caught in the sensor area through the communicating port 3111. Thus, the process of sinking and rising of the magnetic particles 215 may be continuously observed.

Note that the description in the third modification described above is a description applied to the first embodiment, but it is obvious that the present modification may be as well applied to the second embodiment.

Other Modifications to the First and Second Embodiment

Regarding the analyzing apparatus 3 according to the analyzing system 1 of the first and second embodiments described above, the upper magnetic field generator 312 may be configured with the electromagnet instead of the permanent magnet. In other words, both the lower magnetic field generator 311 and the upper magnetic field generator 312 may be configured with the electromagnet, one of the lower magnetic field generator 311 and the upper magnetic field generator 312 may be configured with the electromagnet and the other with the permanent magnet, or both the lower magnetic field generator 311 and the upper magnetic field generator 312 may be configured with the permanent magnet.

Also, the diameter of the communicating port 3111 was formed larger than the maximum diameter of the imager 32 in the analyzing apparatus 3 according to the analyzing system 1 of the first and second embodiments, but the diameter of the communicating port 3111 may be smaller than the maximum diameter of the imager 32. In such case, the moving mechanism 38 may horizontally move between the position applying the magnetic field and the position applying no magnetic field by moving the lower magnetic field generator 311.

Note that the word "processor" used in above descriptions means circuits such as, for example, a Central Processing Unit (CPU), a Graphics Processing Unit (GPU), an Application Specific Integrated Circuit (ASIC), a programmable logic device (for example, a Simple Programmable Logic Apparatus (SPLD), a Complex Programmable Logic Apparatus (CPLD), and a Field Programmable Gate Array (FPGA)). The processor executes functions by reading and executing programs stored in the memory. Note that programs may be configured to be directly integrated in the processor instead of being stored in the memory. In this case, the processor realizes functions by reading and executing programs stored in the circuitry. Note that the processor is not limited to the case placed as a single processor circuitry, but may be configured as a single processor by combining a plurality of independent circuits to realize functions. Furthermore, a plurality of component elements may be integrated into one processor to realize the functions.

While certain embodiments have been described, these embodiments have been presented by way of example only and are not intended to limit the scope of the inventions. The novel devices and methods described in the present disclosure may be in a variety of other forms. Furthermore, various omissions, substitutions and changes may be made for the embodiments of the devices and method of described in the present disclosure without departing from the spirit of the inventions. The embodiments and their modifications are included in the scope and the subject matter of the invention, and at the same time included in the scope of the claimed inventions and their equivalents.

The invention claimed is:

1. An analyzing apparatus, comprising:
a sample placer where a cartridge is placed, the cartridge being capable of storing a sample containing a magnetic substance;
an imager configured to be placed on an opposite surface side of a surface where the cartridge is placed on the sample placer and configured to image the sample by imaging from the opposite surface side; and
a first magnetic field generator configured to be placed on the opposite surface side and to form a communicating port on a position corresponding to the imager and configured to generate a first magnetic field by forming a first magnetic pole around the communicating port,
wherein a second magnetic pole is placed in the first magnetic field generator so that the magnetic field in a substantially vertical direction is formed at a sample position, the second magnetic pole having a magnetic pole different from the first magnetic pole and the sample position being a position where the cartridge that stores the sample is placed on the sample placer; and,
the second magnetic pole in the first magnetic field generator is formed at a spaced position which is apart from the communicating port and which does not affect the magnetic field of the first magnetic pole formed around the communicating port.

2. The analyzing apparatus of claim 1, wherein the spaced position is a position where a distance from the first to the second magnetic pole is three times or more the distance from a center of the communicating port to the first magnetic pole.

3. The analyzing apparatus of claim 1, wherein
the first magnetic field generator comprises a plurality of bar magnets, and
the plurality of bar magnets is placed so that the first magnetic poles of the plurality of bar magnets are arranged around the communicating port and the second magnetic poles of the plurality of bar magnets are arranged on a circumference apart from the communicating port.

4. The analyzing apparatus of claim 3, wherein the plurality of bar magnets is placed so that a longitudinal direction of each of the plurality of bar magnets is parallel to the surface where the cartridge is placed on the sample placer.

5. The analyzing apparatus of claim 3, wherein the plurality of bar magnets is placed so that a longitudinal direction of each of the plurality of bar magnets is perpendicular to the surface where the cartridge is placed on the sample placer.

6. The analyzing apparatus of claim 3, wherein the plurality of bar magnets is placed so that a longitudinal direction of each of the plurality of bar magnets is slanted against the surface where the cartridge is placed on the sample placer.

7. The analyzing apparatus of claim 1, wherein
the first magnetic field generator comprises an annular magnet, and
the annular magnet continuously forms the first magnetic pole around the communicating port and continuously forms the second magnetic pole below the first magnetic pole and in a direction perpendicular to the surface where the cartridge is placed on the sample placer.

8. The analyzing apparatus of claim 7, wherein
the annular magnet is formed by stacking a plurality of annular magnet pieces in the direction perpendicular to the surface where the cartridge is placed on the sample placer.

9. The analyzing apparatus of claim 3, wherein the magnet is a permanent magnet.

10. The analyzing apparatus of claim 9, further comprising a moving mechanism that moves the permanent magnet to a position applying no magnetic field to the magnetic substance.

11. The analyzing apparatus of claim 10, wherein
a diameter of the communicating port is formed to be larger than a maximum diameter of the imager, and
the moving mechanism moves the permanent magnet to the position applying no magnetic field to the magnetic substance so that the imager is inserted into the communicating port.

12. The analyzing apparatus of claim 3, wherein the magnet is an electromagnet comprising a core and a coil wound around the core.

13. The analyzing apparatus of claim 1, wherein the imager images the sample through the communicating port of the first magnetic field generator.

14. The analyzing apparatus of claim 1, wherein when the cartridge is placed on the sample placer, a distance D from a center of the communicating port to a sensor surface, which is a bottom surface of a sample storage that stores the sample in the cartridge, is obtained by an equation as follows $$D=1.1 \times R_1$$

wherein $R_1$ is a radius of a predetermined circumference where the first magnetic pole is located with its center at the center of the communicating port.

15. The analyzing apparatus of claim 1, wherein the first magnetic field generator generates the first magnetic field that moves the magnetic substance in a direction towards the imager.

16. The analyzing apparatus of claim 1, further comprising a second magnetic field generator configured to be placed on a side of a surface where the cartridge is placed on the sample placer and configured to generate a second magnetic field which moves the magnetic substance contained in the sample in a direction apart from the imager.

17. A magnetic field generating apparatus for an analyzing apparatus, wherein the analyzing apparatus comprises:
a sample placer where a cartridge is placed, the cartridge being capable of storing a sample containing a magnetic substance; and
an imager configured to be placed on an opposite surface side of a surface where the cartridge is placed on the sample placer and configured to image the sample by imaging from the opposite surface, comprising:
a first magnetic field generator configured to be placed on the opposite surface side and to form a communicating port on a position corresponding to the imager and configured to generate a first magnetic field by forming a first magnetic pole around the communicating port,
wherein a second magnetic pole is placed in the first magnetic field generator so that the magnetic field in a substantially vertical direction is formed at a sample position, the second magnetic pole having a magnetic pole different from the first magnetic pole and the sample position being a position where the cartridge that stores the sample is placed on the sample placer; and, the second magnetic pole in the first magnetic field generator is formed at a spaced position which is apart from the communicating port and which does not affect the magnetic field of the first magnetic pole formed around the communicating port.

18. An analyzing method that analyzes samples using a sample placer where a cartridge is placed, the cartridge being capable of storing the sample containing a magnetic substance, an imager configured to be placed on an opposite surface side of a surface where the cartridge is placed on the sample placer and configured to image the sample by imaging from the opposite surface, and a first magnetic field generator configured to be placed on the opposite surface side and form a communicating port on a position corresponding to the imager and configured to generate a first magnetic field by forming a first magnetic pole around the communicating port, the analyzing method comprising:

placing the cartridge on the sample placer;

generating the first magnetic field with the first magnetic field generator to move the magnetic substance; and imaging the sample placed on the sample placer with the imager, wherein a second magnetic pole is placed in the first magnetic field generator so that the magnetic field in a substantially vertical direction is formed at a sample position, the second magnetic pole having a magnetic pole different from the first magnetic pole and the sample position being a position where the cartridge that stores the sample is placed on the sample placer; and, the second magnetic pole in the first magnetic field generator is formed at a spaced position which is apart from the communicating port and which does not affect the magnetic field of the first magnetic pole formed around the communicating port.

\* \* \* \* \*